United States Patent
Weiner et al.

(10) Patent No.: US 12,216,381 B2
(45) Date of Patent: Feb. 4, 2025

(54) OPTICAL QUANTUM LOGIC FOR USE IN LARGE OPERATIONAL SPACES

(71) Applicant: Purdue Research Foundation, West Lafayette, IN (US)

(72) Inventors: Andrew Weiner, West Lafayette, IN (US); Poolad Imany, Boulder, CO (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/313,409

(22) Filed: May 8, 2023

(65) Prior Publication Data

US 2024/0012309 A1    Jan. 11, 2024

Related U.S. Application Data

(62) Division of application No. 16/870,754, filed on May 8, 2020, now Pat. No. 11,681,200.

(60) Provisional application No. 62/846,556, filed on May 10, 2019.

(51) Int. Cl.
| | |
|---|---|
| *G02F 3/00* | (2006.01) |
| *G01J 1/42* | (2006.01) |
| *G06N 10/00* | (2022.01) |
| *H04B 10/70* | (2013.01) |

(52) U.S. Cl.
CPC ............ *G02F 3/00* (2013.01); *G01J 1/42* (2013.01); *G06N 10/00* (2019.01); *H04B 10/70* (2013.01)

(58) Field of Classification Search
None
See application file for complete search history.

(56) References Cited

PUBLICATIONS

Kimble, H. J. The quantum internet. Nature, 2008, 453, 1023.
Knill, E., Laflamme, R. & Milburn, G. J. A scheme for efficient quantum computation with linear optics, Nature, 2001, 409, pp. 46-52.
Erhard, M., Malik, M., Krenn, M. & Zeilinger, A., Experimental Greenberger-Horne-Zeilinger entanglement beyond qubits. Nature Photonics, 2018, doi:10.1038/s41566-018-0257-6.
Bouwmeester, D. et al., Experimental quantum teleportation, Nature, 1997, doi:10.1038/37539.
Boschi, D., Branca, S., De Martini, F., Hardy, L. & Popescu, S., Experimental realization of teleporting an unknown pure quantum state via dual classical and einstein-podolsky-rosen channels. Phys. Rev. Letters, 1998, doi:10.1103/PhysRevLett.80.1121.
Roa, L., Delgado, A. & Fuentes-Guridi, I., Optimal conclusive teleportation of quantum states, Phys. Rev. A At. M al. Opt. Phys., 2003, 68, 6.
Shor, P. W. Polynomial time algorithms for discrete logarithms and factoring on a quantum computer in Algorithmic Number Theory, First International Symposium, ANTS-I Proceedings, 1994, 289, doi: 10.1137/S0097539795293172.
Crespi, A. et al., Integrated photonic quantum gates for polarization qubits, Nat. Commun, 2011, 2.

(Continued)

*Primary Examiner* — Matthew L Reames
(74) *Attorney, Agent, or Firm* — Maginot, Moore & Beck LLP

(57) ABSTRACT

A method of generating a photon with multiple dimensions includes a step of generating a first photon encoded with quantum information in each of two or more frequency bins and at least one time bin. The method further includes performing a frequency dependent time operation to entangle (i.e. make non-separable) the frequency bins and the time bins in the photon.

8 Claims, 9 Drawing Sheets

(56) References Cited

PUBLICATIONS

Babazadeh, A. et al., High-Dimensional Single-Photon Quantum Gates: Concepts and Experiments.,Phys. Rev. Letters, 2017, 119.
Humphreys, P. C. et al., Linear optical quantum computing in a single spatial mode, Phys. Rev. Letter, 2013, 111.
Lu, H. H. et al., Electro-Optic Frequency Beam Splitters and Tritters for High-Fidelity Photonic Quantum Information Processing. Phys. Rev. Lett, 2018, 120.
Fiorentino, M. & Wong, F. N. C., Deterministic controlled-NOT gate for single-photon two-qubit quantum logic, Phys. Rev. Letters, 2004, 93.
Kagalwala, K. H., Di Giuseppe, G., Abouraddy, A. F. & Saleh, B. E. A., Single-photon three-qubit quantum logic using spatial light modulators, Nat. Commun, 2017, 8, 739.
Fang, W.-T. et al., Towards high-capacity quantum communications by combining wavelength- and time division multiplexing technologies, 2018, arXiv Prepr. arXivl 803.02003.
Humphreys, P. C. et al., Continuous-variable quantum computing in optical time-frequency modes using quantum memories. Phys. Rev. Letters, 2014, 113.
Marin-Palomo, P. et al., Microresonator-based solitons for massively parallel coherent optical communications. Nature, 2017, 546, pp. 274-279.
Cerf, N. J., Adami, C. & Kwiat, P. G., Optical simulation of quantum logic. Phys. Rev. A, 1998, 57, R1477-R1480.
Sheng, Y. B., Deng, F. G. & Long, G. L., Complete hyper entangled-Bell-state analysis for quantum communication, Phys. Rev. A-At. M al. Opt. Phys., 2010, 82.
Wootters, W. K. & Fields, B. D. Optimal state-determination by mutually unbiased measurements. Ann. Phys. (N. Y), 1989, doi:10.1016/0003-4916(89)90322-9.
Lukens, J. M., Islam, N. T., Lim, C. C. W. & Gauthier, D. J., Reconfigurable generation and measurement of mutually unbiased bases for time-bin qudits. Appl. Phys. Letters, 2018, doi: 10.1063/1.5024318.
Sheridan, L. & Scarani, V., Security proof for quantum key distribution using qudit systems, Phys. Rev. A-At. M al. Opt. Phys., 2010, doi:10.1103/PhysRevA.82.030301.
Islam, N. T., Lim, C. C. W., Cahall, C., Kim, J. & Gauthier, D. J., Provably secure and high-rate quantum key distribution with time-bin qudits. Sci. Adv., 2017, 3.
Jaramillo-Villegas, J. A. et al., Persistent energy-time entanglement covering multiple resonances of an on chip biphoton frequency comb. Optica, 2016, 4, pp. 655-658.
Reimer, C. et al., Generation of multi-photon entangled states with integrated optical frequency comb sources, Science, 2016, 80, 351, 2-3.
Kues, M. et al., On-chip generation of high-dimensional entangled quantum states and their coherent control, Nature, 2017, 546, pp. 622-626.
Imany, P. et al., 50-GHz-spaced comb of high-dimensional frequency-bin entangled photons from an on-chip silicon nitride micro resonator, Opt. Express, 2018, 26, pp. 1825-1840.
Brennen, G. K., Bullock, S. S. & O'Leary, D. P., Efficient Circuits for Exact-universal Computation with Qudits, Quantum Info. Comput. 2006, 6, pp. 436-454.
Wang, X., Sanders, B. C. & Berry, D. W., Entangling power and operator entanglement in qudit systems. Phys. Rev. A-At. M al., Opt. Phys., 2003, 67, 8.

Draper, T. G., Kutin, S. A., Rains, E. M. & Svare, K. M., A logarithmic-depth quantum carry—look ahead adde. Quantum Info. Comput., 2006, 6, pp. 351-369.
Imany, P., Odele, 0. D., Jaramillo-Villegas, J. A., Leaird, D. E. & Weiner, A. M., Characterization of coherent quantum frequency combs using electro-optic phase modulation. Phys. Rev. A 97, 2018.
Martin, A. et al., Quantifying Photonic High-Dimensional Entanglement. Phys. Rev. Lett. 118, 2017.
Tiranov, A. et al. Quantification of multidimensional entanglement stored in a crystal. Phys. Rev. A 96, 2017.
Barreiro, J. T., Wei, T. C. & Kwiat, P. G., Beating the channel capacity limit for linear photonic super dense coding. Nat. Phys. 4, 2008, pp. 282-286.
Pan, J. W., Bouwmeester, D., Daniell, M., Weinfurter, H. & Zellinger, A. Experimental test of quantum nonlocality in three-photon Greenberger-Horne-Zeilinger entanglement. Nature, 2000, 403, pp. 515-519.
Hillery, M., Buzek, V. & Berthiaume, A., Quantum secret sharing. Phys. Rev. A-At. M al. Opt. Phys. 1999, doi:10.1103/PhysRevA. 59.1829.
Zhao, Z. et al., Experimental demonstration of five-photon entanglement and open-destination teleportation, Nature, 2004, doi: 10.1038/nature02643.
Wang, X. L. et al., 18-Qubit Entanglement with Six Photons' Three Degrees of Freedom, Phys. Rev. Lett. 120, 2018.
Reimer, C. et al., High-dimensional one-way quantum processing implemented on d-level cluster states, Nat. Phys., 2018, 1.
Pant, M., Towsley, D., Englund, D. & Guha, S., Percolation thresholds for photonic quantum computing, 2017, arXiv Prepr. arXiv1701.03775.
Wang, J. et al., Reconfigurable radio-frequency arbitrary waveforms synthesized in a silicon photonic chip, Nat. Commun. 2015, 6.
Wang, J. et al., Multidimensional quantum entanglement with large-scale integrated optics, Science, 2018, pp. 80-.
Ikuta, T. & Takesue, H., Four-dimensional entanglement distribution over 100 km. Sci. Rep., 2018, 8.
Malik, M. et al., Multi-photon entanglement in high dimensions, Nat. Photonics, 2016, 10, pp. 248-252.
Erhard, M., Fickler, R., Krenn, M. & Zeilinger, A., Twisted photons: new quantum perspectives in high dimensions, Light Sci. & Amp; Appl., 2018, 7, 17146.
Lu, H.-H. et al., Simulations of Subatomic Many-Body Physics on a Quantum Frequency Processor, 2018, arXiv Prepr. arXiv1810.03959.
Sparrow, C. et al., Simulating the vibrational quantum dynamics of molecules using photonics, Nature, 2018, 557, pp. 660-667.
Bernien, H. et al., Probing many-body dynamics on a 51-atom quantum simulator, Nature, 2017, 551, pp. 579-584.
De Greve, K. et al., Complete tomography of a high-fidelity solid-state entangled spin-photon qubit pair, Nat. Commun. 4, 2013, 2228.
Blume-Kohout, R. Optimal, reliable estimation of quantum states, New J. Phys., 2010, 12.
Williams, B. P. & Lougovski, P., Quantum state estimation when qubits are lost: A no-data-left-behind approach, New J. Phys. 19, 2017.
Bertlmann, R. A. & Krammer, P., Bloch vectors for qudits. J. Phys. A Math. Theor, 2008, 41.
O'Brien, J. L. et al., Quantum Process Tomography of a Controlled-NOT Gate. Phys. Rev. Lett, 2004, 93, 80502.
Thew, R. T., Adn, A., Zbinden, H. & Gisin, N., Bell-type test of energy-time entangled qutrits, Phys. Rev. Lett., 2004, 93, 010503-1.

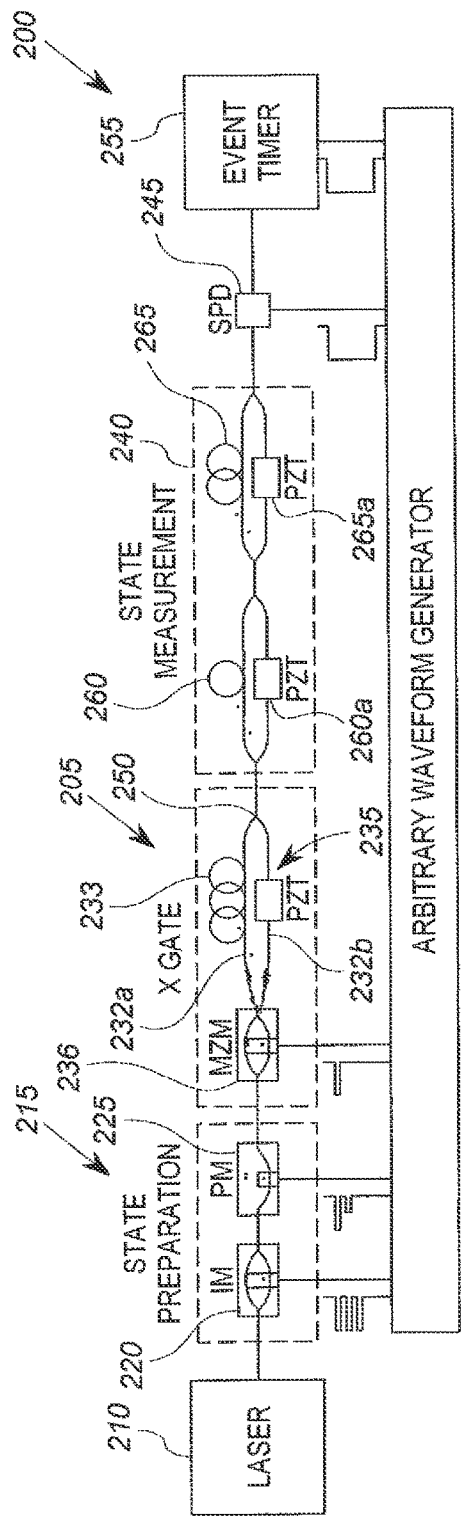
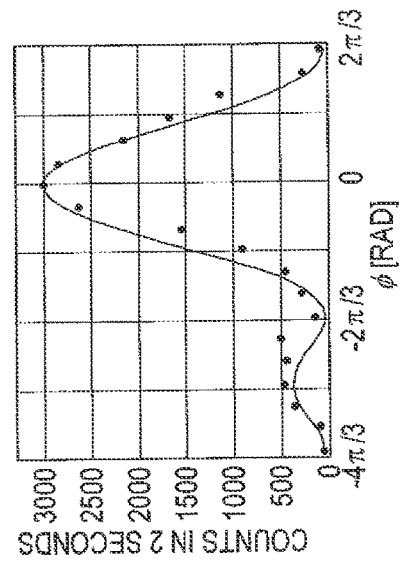
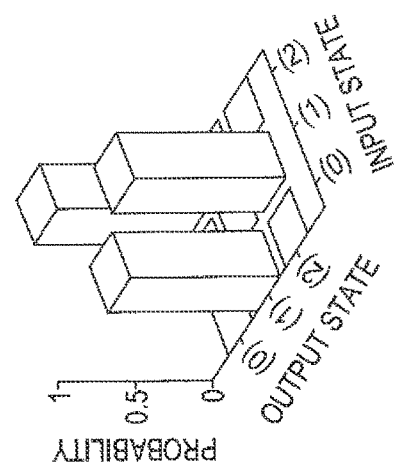
FIG. 4a
FIG. 4b
FIG. 4c

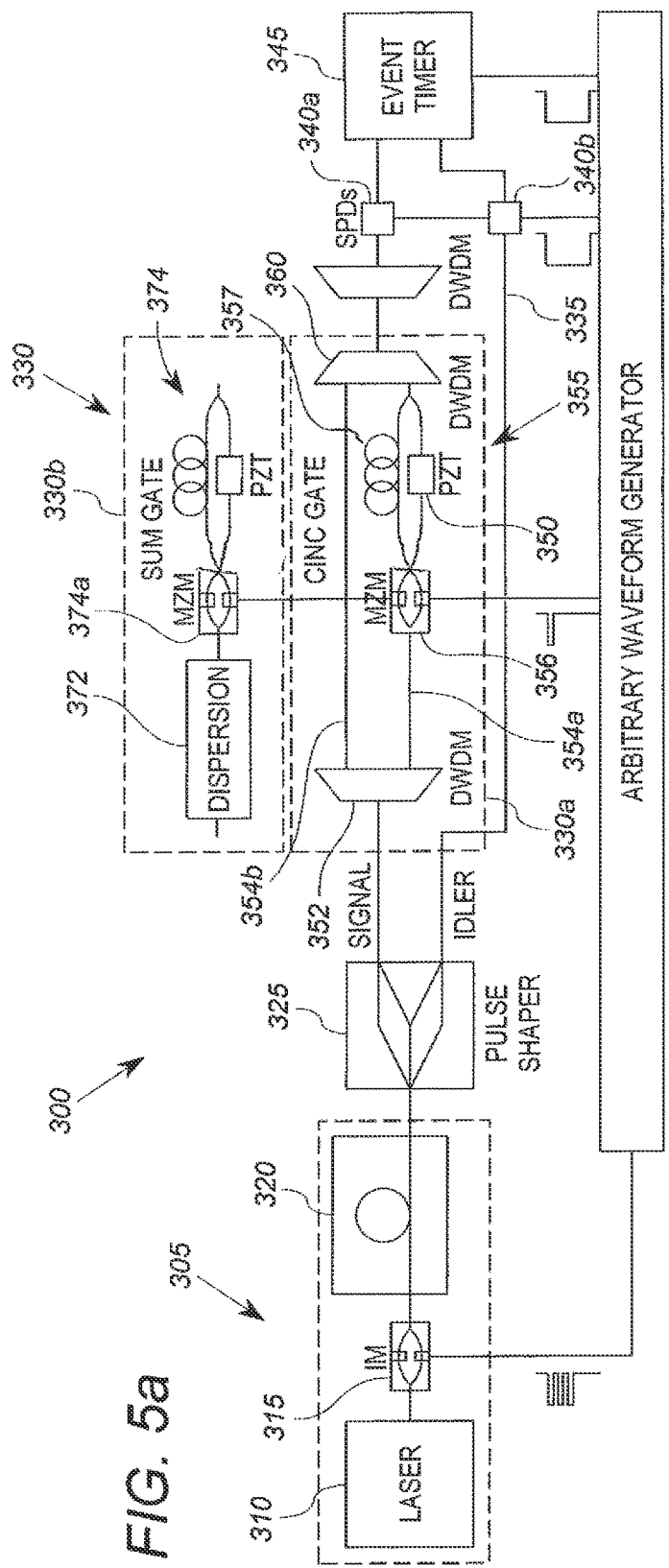
FIG. 5a
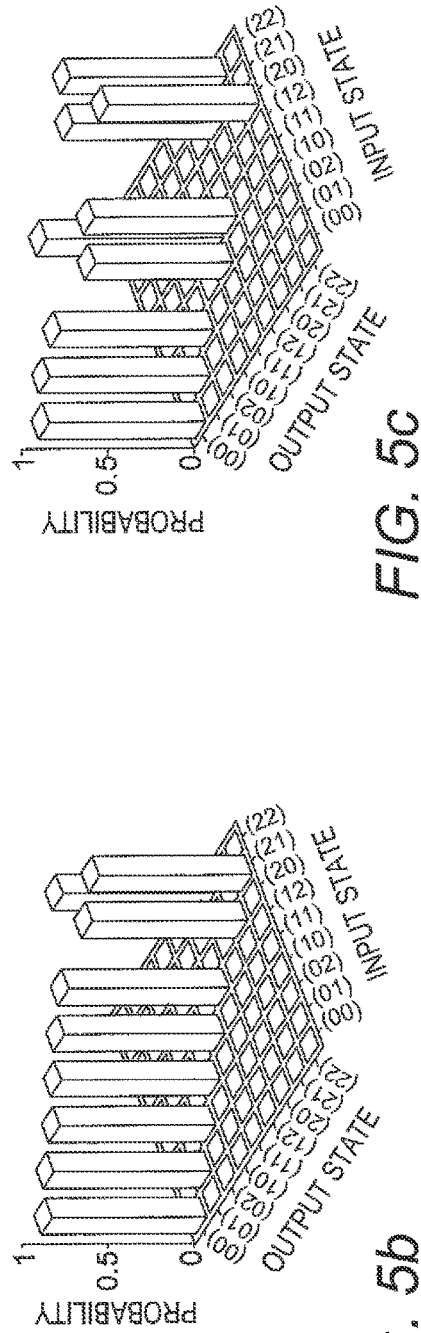
FIG. 5b
FIG. 5c

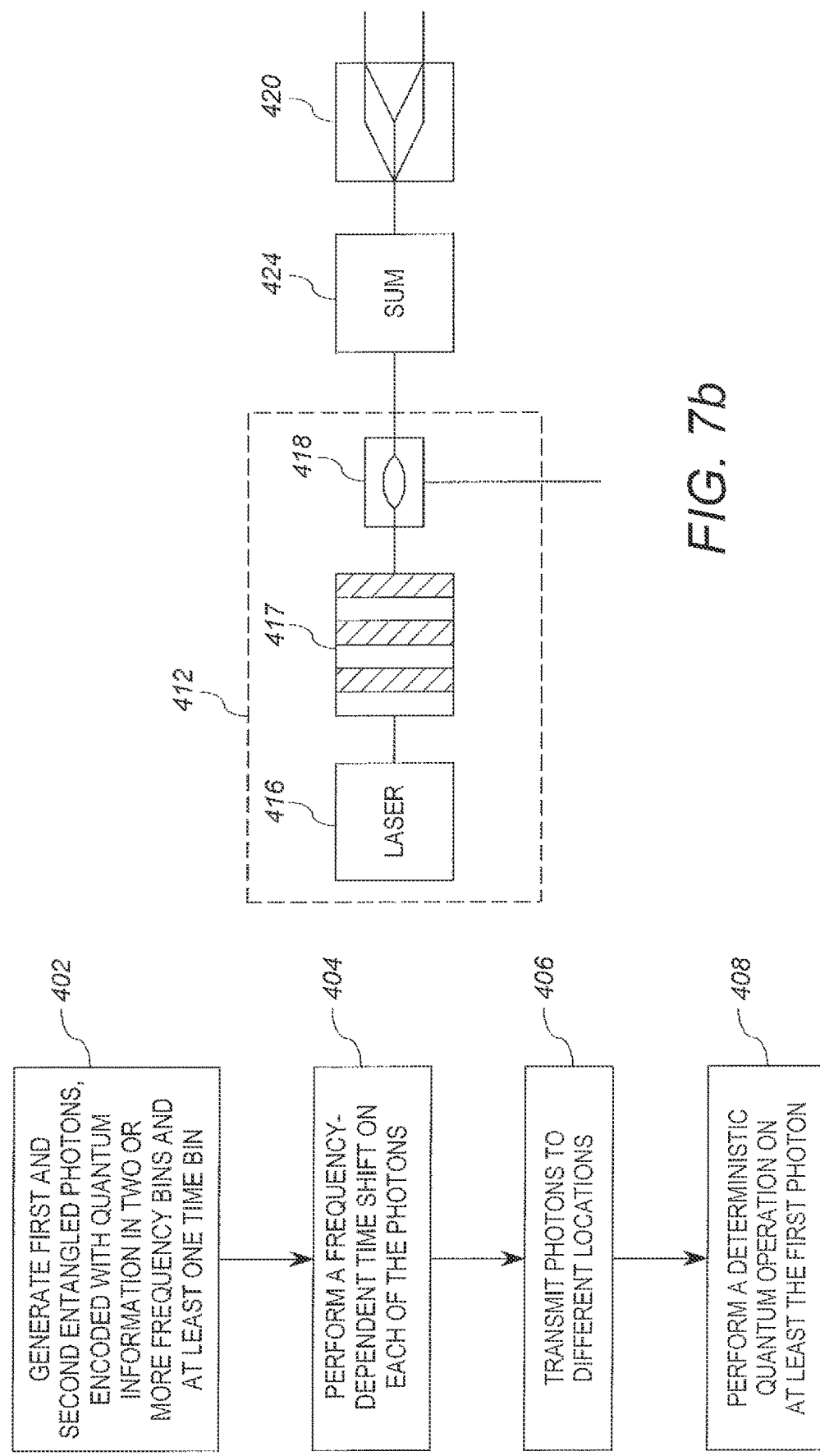

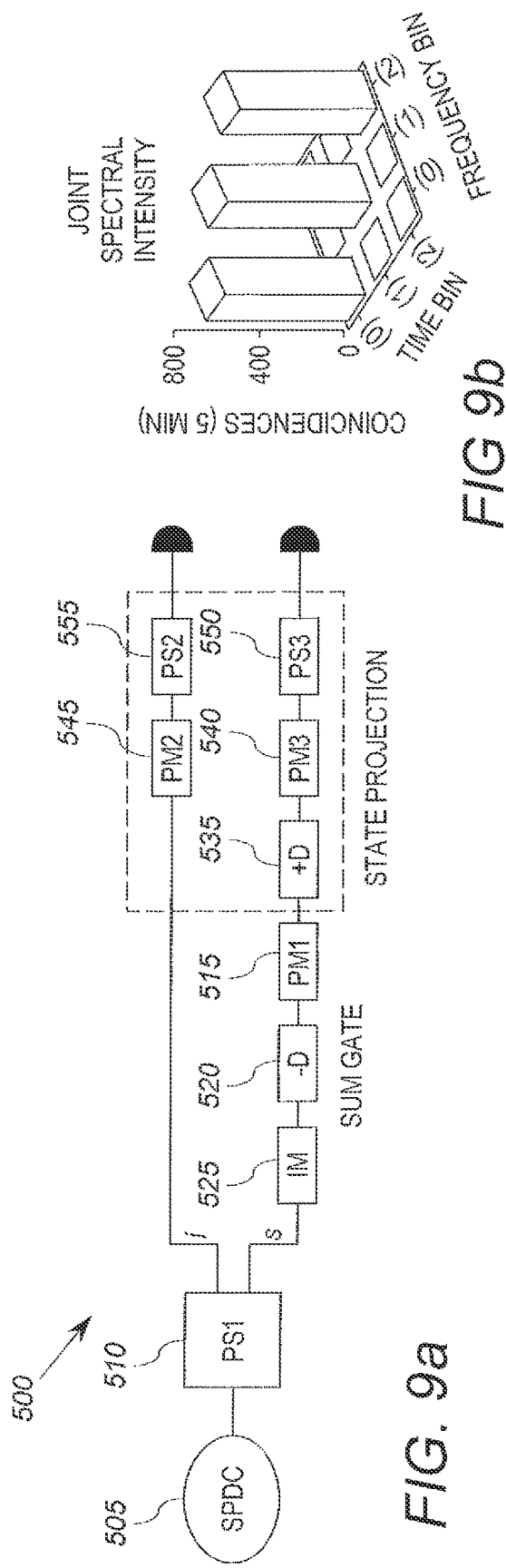
FIG. 9a
FIG. 9b
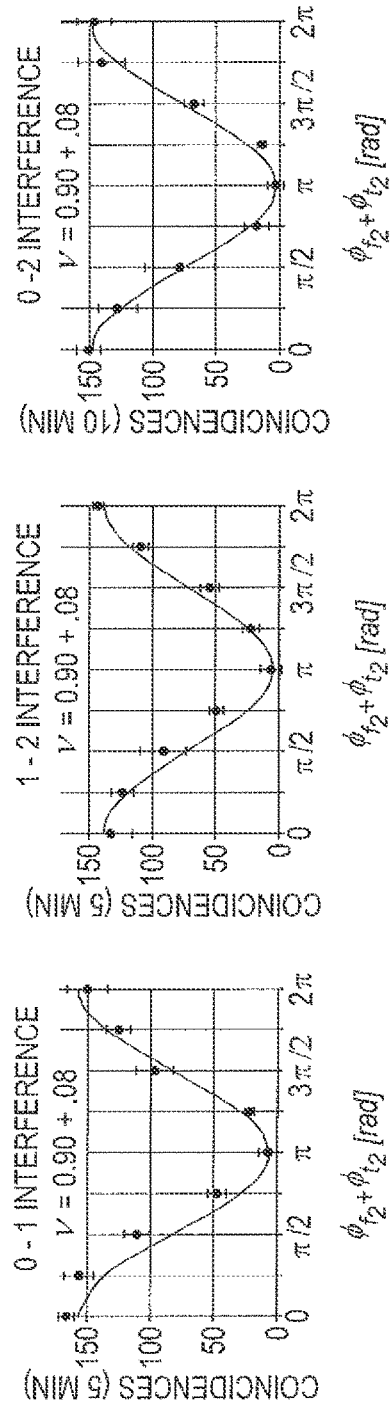
FIG. 9c

US 12,216,381 B2

OPTICAL QUANTUM LOGIC FOR USE IN LARGE OPERATIONAL SPACES

This application is a divisional application of U.S. patent application Ser. No. 16/870,754, filed on May 8, 2020, the disclosure of which is herein incorporated by reference in its entirety. U.S. patent application Ser. No. 16/870,754 claims the benefit of priority of U.S. Provisional Application Ser. No. 62/846,556, filed May 10, 2019, the disclosure of which is herein incorporated by reference in its entirety.

GOVERNMENT LICENSE RIGHTS

This invention was made with government support under funding number 1839191-ECCS awarded by the National Science Foundation. The government has certain rights in the invention.

FIELD

The present invention relates to quantum information processing.

BACKGROUND

Generation of highly-entangled particles has promising applications in the area of quantum information processing (QIP). One of the main challenges in today's QIP is to scale up the operational space—also referred to as Hilbert space—that quantum processing can take place in. To do so, generation of large-scale entangled states has drawn attention. The simplest entangled states are when two quantum particles are entangled in a two-dimensional form, which can be represented as:

$$|\psi\rangle = |0,0\rangle_{1,2} + |1,1\rangle_{1,2} \quad (1)$$

where $|\psi\rangle$ denotes the wavefunction of the quantum state. For simplicity, the normalization factors are not included in any of the equations in this document. On the right-hand side of Eq. (1), particles 1 and 2 are represented as two-dimensional quantum bits (qubits), where each of these particles can be in a state $|0\rangle$ or $|1\rangle$, or a superposition of the two values. From Eq. (1) we can see that if particle 1 is measured in state $|0\rangle$ or $|1\rangle$, particle 2 is also in the same state.

To scale up this form of entanglement, two approaches can be taken. One is to increase the number of dimensions of each state, resulting in high-dimensional entanglement. These states can be written in the form:

$$|\psi\rangle = \sum_{m=0}^{d-1} |m, m\rangle_{1,2} \quad (2)$$

where d is the number of dimensions for each particle. Here, each particle represents a d-level unit of quantum information (qudit). We note that Eq. (2) represents a bipartite d-dimensional entangled state that occupies a Hilbert space of $d^2$. (Bipartite means two parties, which we designate "1" and "2.")

Another way to scale up the entanglement is to increase the number of entangled particles. This opens the door to a number of different forms of entanglement. One of the most useful forms of multipartite entanglement is called Greenberger-Horne-Zeilinger (GHZ) entangled states [1]. A popular form of GHZ state is an N-partite (N parties) two-dimensional state, which can be expressed as:

$$|\psi\rangle = |0,0,\ldots,0\rangle_{1,2,\ldots,N} + |1,1,\ldots,1\rangle_{1,2,\ldots,N} \quad (3)$$

where by measuring one of these particles in the $|0\rangle/|1\rangle$ basis, the state of all the other particles will be known. GHZ states are the most interesting multipartite entangled state since they exhibit the most amount of entanglement possible between multiple particles. This state occupies a Hilbert space with $2^N$ dimensions. Scaling up the entanglement in a system can be used as a resource to carry large-scale quantum information processing protocols, which have drawn massive attention due to their power in solving some crucial algorithms exponentially faster than their classical counterparts, as well as its ability to transmit information in a fully secure fashion. The two capabilities looked to be combined in the emerging quantum internet.

Among the platforms that can exhibit quantum behavior, optical states have the advantages of low decoherence and suitability for long-distance communications. However, the weak coupling of photons to their surroundings also makes it extremely difficult to manipulate the state of one photon based on the state of another, also known as two-qubit gates. Such manipulation, needed for a two-qubit gate, is probabilistic with standard linear optics and photon counting, as discussed in Knill, E., Laflamme, R. & Milburn, G. J. "A scheme for efficient quantum computation with linear optics." *Nature* 409, 46-52 (2001). This presents a major challenge in scaling up photonic quantum information processing.

To illustrate the probabilistic nature of the prior art two-qubit gates, FIG. 1 shows an input/output block diagram of photons 12 having various quantum states 12a, 12b, 12a/b passing through a probabilistic process 14. As illustrated in FIG. 1, a plurality of 2 $\log_2 d$ photons 12 holding one qubit each go through a probabilistic quantum process 14. The input/output qubits can be in the states 12a, 12b or a superposition of the two 12a/b. The probabilistic quantum process 14 can be any set of one- and two-qubit quantum logic gates that produce output states of the photons 12 based on the input states. Because of the probabilistic process associated with two-qubit gates, there is a possibility that the photons 12 do not come out through the desired outputs. Hence, the first two output qubits are not shown (signifying gate failure).

Quantum gates have been demonstrated in a number of different degrees of freedom in photons such as polarization, orbital angular momentum, time, and frequency. To overcome the issue of probabilistic multiphoton interactions, encoding qubits in different degrees of freedom (DoFs) in a single photon has been demonstrated, where each DoF carries one qubit and, now, operations between different qubits can be made deterministic. Unlike probabilistic operations for qubits encoded in different photons, two-qubit gates operating on qubits encoded in different DoFs of a single photon can perform deterministically. Examples of such encoding are described in Fiorentino, M. & Wong, F. N. C. "Deterministic controlled-NOT gate for single-photon two-qubit quantum logic." *Phys. Rev. Lett.* 93, (2004), and 13. Kagalwala, K. H., Di Giuseppe, G., Abouraddy, A. F. & Saleh, B. E. A. "Single-photon three-qubit quantum logic using spatial light modulators." *Nat. Commun.* 8, 739 (2017).

Even though in this case two and three-qubit operations can be executed with unity success probability, each DoF contains only one qubit, and the number of a photon's DoFs are limited; thus the size of the Hilbert space in which these deterministic transformations can happen is fairly moderate (e.g., an eight-dimensional Hilbert space has been demonstrated by encoding three qubits in three different DoFs of a single photon.)

There is a need, therefore, for a way in which deterministic logic gate transformations can happen in larger Hilbert spaces.

SUMMARY

At least some embodiments described herein address the foregoing need by implementing gates and systems that enable combining the two notions of high-dimensionality and N-partite entanglement in photons.

A first embodiment is a method of generating a photon with multiple dimensions that includes a step of generating a first photon encoded with quantum information in each of two or more frequency bins and at least one time bin. The method further includes performing a frequency dependent delay to entangle (i.e. make inseparable) the frequency bins and the time bins in the photon.

In some variants, the frequency dependent delay is carried out by separating at least two of the frequency bins into at least first and second spatial paths. The paths are configured such that in the first spatial path, a time-bin operation is performed that is different from the time-bin operation of the second spatial path. The frequency bins are recombined into an output special path.

In other variants, the frequency dependent delay is carried out by performing a group velocity dispersion to delay frequency bins based on frequency within a single path, which may be carried out, for example, by a chirped fiber Bragg grating.

In a second embodiment, a method of generating photons with multiple dimensions includes a step of generating a first and second photon, each encoded with quantum information in each of two or more frequency bins and at least one time bin. The method further includes performing a frequency dependent delay on each of the first and second photons to entangle the time and frequency bins within each photon to create four-party inseparable states, which may suitably be multidimensional Greenberger-Horne-Zeilinger states.

The above described features and advantages, as well as others, will become more readily apparent to those of ordinary skill in the art by reference to the following detailed description and accompanying drawings.

BRIEF DESCRIPTION OF THE DRAWINGS

FIG. 4a shows a schematic block diagram of an X gate or cyclic shift gate in the time DoF according to an embodiment, in an experimental set-up to demonstrate its efficacy;

FIG. 4b shows the experimental transformation matrix performed by the time-bin X gate of FIG. 4a when probed by single time bins;

FIG. 4c shows a graph of the interference pattern resulting from the operation of the phase modulator in state preparation in the set-up of FIG. 4a;

FIG. 5a shows a schematic block diagram of an experimental set up for two-qudit gates for a single photon;

FIG. 5b shows the experimental transformation matrix of the CINC gate of FIG. 5a;

FIG. 5c shows the experimental transformation matrix of the SUM gate of FIG. 5a;

FIG. 7a shows a flow diagram of another method that generates multiparty states in the frequency and time degrees of freedom;

FIG. 7b shows a schematic block diagram of an apparatus for generating large-scale optical entangled states using high-dimensional quantum logic;

FIG. 8b shows a zoomed-in 32×32 submatrix of the matrix of FIG. 8a;

FIG. 8c shows another zoomed-in 32×32 submatrix of the matrix of FIG. 8a;

FIG. 9a shows schematic block diagram of an experimental set-up of a SUM gate that does not include an interferometer, to show the coherence preservation during the process;

FIG. 9b shows a graph of a transfer matrix of the SUM gate of FIG. 9a;

FIG. 9c shows graphs of measured two-dimensional interference patterns between all three time bins and frequency bins in the operation of the SUM gate of FIG. 9a.

DESCRIPTION

As discussed above, amongst the myriad quantum systems suitable for information processing, photons have the critical advantage of extremely low decoherence, with minimal interaction with their surrounding environment, and therefore are ideal for quantum communications and networking. This isolation, however, has the downside of also making photon-photon interactions for two-qubit gates difficult and, with linear optics, inherently probabilistic.

Figure 1:
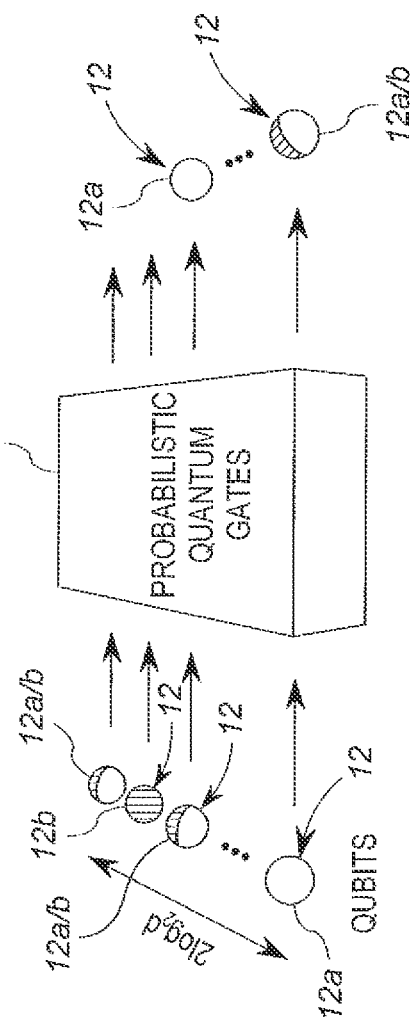
FIG. 1 shows an input/output block diagram of photons having a single qubit having various quantum states passing through a prior art probabilistic process.
Figure 2:
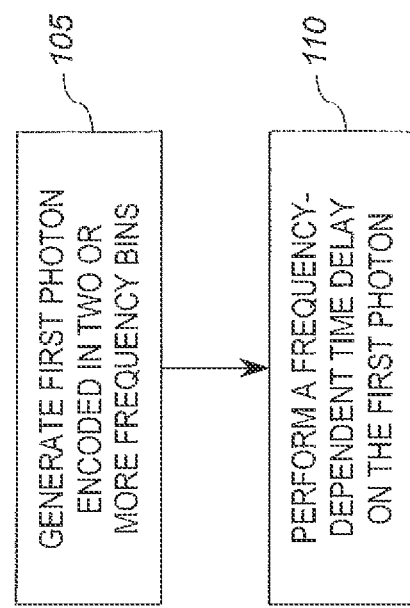
FIG. 2 shows an exemplary method of generating at least one photon to encode qudits in the time and frequency domain.

In this disclosure, the high dimensionality in two particular DoFs of a single photon—namely, time and frequency, which are both compatible with fiber optical transmission—is used to encode one qudit in each DoF. FIG. 2 shows an example of a method of generating at least one photon with encoded quantum information in one of more degrees of freedom with multiple dimensions. In step 105, a first photon encoded with quantum information in two or more frequency bins and at least one time bin. In step 110, a frequency dependent time operation is performed to generate nonseparability between the frequency bins and at least two time bins in the photon. Nonseparability is the same as entanglement, but is used when entanglement is between quantum information encoded in different degrees of freedom in a single photon.

In one example, step 105 can start by generating a photon with two frequency bins and one time bin, having states expressed as:

$$|\psi\rangle = \frac{1}{\sqrt{2}}(|0\rangle_f + |1\rangle_f) \otimes |0\rangle_t,$$

where the frequency can be in a superposition of bins 0 or 1, and time is in bin 0. After the frequency dependent delay of step 110, in the frequency bin 1, the time bin is shifted to 1 as well, resulting in states of the form:

$$|\psi\rangle = \frac{1}{\sqrt{2}}(|0\rangle_f |0\rangle_t + |1\rangle_f |1\rangle_t),$$

which is a nonseparable (entangled) state. After the frequency dependent delay, at least two time bins exist.

Figure 3:
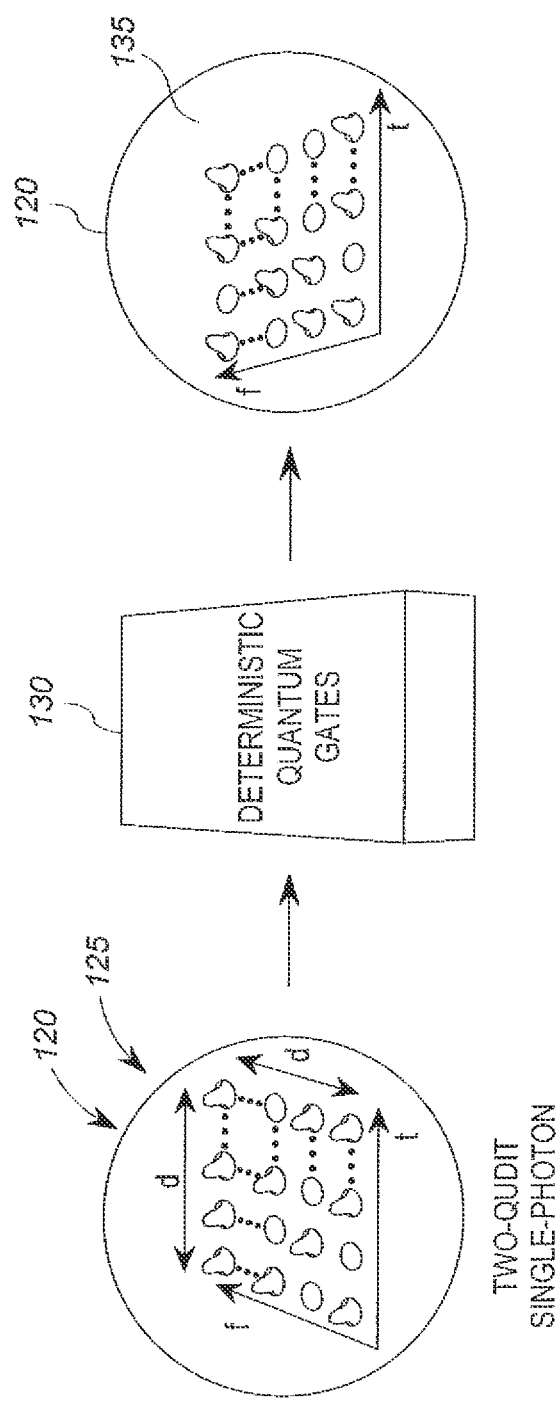
FIG. 3 shows a diagram of a deterministic quantum operation on a single photon with encoded high-dimensional quantum information in both time and frequency DoFs, which may be generated by the process of FIG. 2.

Step 110 may be carried out by a novel quantum SUM gate discussed herebelow. FIG. 3 shows a diagram of a deterministic quantum operation on an exemplary single photon with encoded high-dimensional quantum information in both time and frequency DoFs, generated by the process of FIG. 2. In particular, the first photon 120 may be generated by the process of FIG. 2 in this example to have two qudits encoded in d time bins and d frequency bins, shown in the graph 125. The photon 120 can be encoded in an arbitrary superposition of different time and frequency bins. The unused time-frequency slots are shown with dashed circles. The first photon 120 then goes through a deterministic quantum process 130, for example, a logic gate, to modify the encodings in the photon. After the deterministic quantum process 130 operates on the two-qudit state, the orientation of the time-frequency superpositions change to a new two-qudit state, as illustrated in the graph 135.

A related process is at work in the advanced optical modulation formats gaining adoption in modern digital communications, where many bits are encoded in a single symbol via modulation of canonically conjugate quadratures, as described in Marin-Palomo, P. et al. "Microresonator-based solitons for massively parallel coherent optical communications." *Nature* 546, 274-279 (2017).

Since single photons can be generated in a superposition of many time and frequency bins, multiple qubits can be encoded in each DoF, making such photons a favorable platform for deterministic optical quantum information processing on Hilbert spaces dramatically larger than previously demonstrated deterministic qubit-based gates. Due to the limitation of the number of high-dimensional degrees of freedom in photons, the Hilbert space for deterministic operations cannot get exponentially scaled by adding qudits to the system. Instead, the extension of the Hilbert space is carried out by increasing the dimensions in each degree of freedom.

While enabling only linear scaling of the Hilbert space with the number of modes in photons, qudit encoding promises significant potential in the current generation of quantum circuits. It has been shown, for example, in Roa, L., Delgado, A. & Fuentes-Guridi, I. "Optimal conclusive teleportation of quantum states." *Phys. Rev. A* 68, 022310 (2003), that two-qudit optical gates are useful in transmitting quantum states with higher information content per photon by means of qudit teleportation. Such qudit teleportation requires two-qudit gates which can operate on the different degrees of freedom of a single photon. The photons generated by the embodiments disclosed herein have such functionality.

FIG. 4a shows a schematic block diagram of an experimental implementation of the X gate 205, which is a building block to two-qudit gates which can operate photons to carry out the method of FIG. 2. In particular, a building block to such functionality is enabling the realization of all single-qudit unitaries. To this end, it is sufficient to demonstrate the generalized Pauli gates X (cyclic shift) and Z (state-dependent phase), which are universal for single-qudit operations, and from which all d-dimensional Weyl operators can be constructed. The Z gate applies a unique phase shift to each of the d basis states, which can be easily executed with a phase modulator and a pulse shaper in the time domain and frequency domain, respectively. Specifically, for the basis state $|n\rangle$ $(n=0, \ldots, d-1)$, we have $Z|n\rangle = \exp(2\pi i n/d)|n\rangle$.

Illustrated in FIG. 4a, however, is a more challenging X gate, which realizes the transformation $X|n\rangle = |n \oplus 1\rangle$, where $\oplus$ denotes addition modulo d. Referring to FIG. 4a, the functionality of the X gate or cyclic shift gate 205 is shown in an experimental set-up 200 to demonstrate its efficacy. The X gate 205 performs a time-bin operation, which is a quantum operation that acts on the quantum information encoded in the time degree of freedom, regardless of the state in the frequency domain.

The experimental set-up 200 includes a laser 210, a state preparation unit 215, the X gate 205, and a state projection unit 240, and a single photon detector 245. The X gate 205 in this embodiment includes a Mach-Zender modulator switch 230, a delay element (interferometer or other known interferometric structure) 233 and a piezo-electric phase shifter 235. In general, the X gate 205 operates on time bins in three dimensions, a process which corresponds to state-dependent delay. Because the X gate 205 operates on each photon individually, we can fully characterize its performance with coherent states, and the statistics of the input field have no impact on the principle of operation.

Accordingly, a continuous-wave (CW) laser 210 cooperates with a state preparation unit 215 to generate a desired weak coherent state. The state preparation unit 215 in this embodiment includes an intensity modulator 220 and a phase modulator 225. Specifically, the laser 210 generates a continuous-wave single-frequency beam. The intensity modulator 220 carves out three time bins $\{|0\rangle_t, |1\rangle_t, |2\rangle_t\}$ to generate light pulses. The phase modulator 225 manipulates their relative phases to complete the preparation of the desired weak coherent state. The time bins are 3 ns wide with $\Delta t = 6$ ns center-to-center spacing.

To perform the X gate operation, the time bins $|0\rangle_t$ and $|1\rangle_t$ are separated from $|2\rangle_t$ using a Mach-Zehnder modulator (MZM) switch 236 and the path 232a for time bins $|0\rangle_t$ and $|1\rangle_t$ is delayed by 3 bins (18 ns). The interferometer 233 carries on the delay on the first path 232a, and the piezo-electrical phase shifter (PZT) stabilizes the relative phase between the two arms of the interferometer 232a and 232b. The circle-shaped fibers of interferometer 233 indicate the delay, with each circle is equivalent to one time-bin delay (6 ns). While most MZM designs are one-port devices, with one of the two output paths terminated, the MZM switch 236 is a 1×2 version that permits access to both interferometer outputs. Accordingly, it is in principle lossless—as required for a unitary operation. In practice, however, insertion loss reduces throughput, but this is of a technical nature and not fundamental to the method. It will be appreciated that the interferometer 233 may be replaced by other known interferometric structures.

After the interferometer 233 performs the path-dependent delay, another 1×2 MZM operated in reverse, (not shown in FIG. 4a) can be used to recombine the time bins deterministically. However, in the proof-of-principle experiment of FIG. 4, a 2×2 fiber coupler 250 is used for recombination, which introduces an additional 3 dB power penalty. For the measurement scheme, the single photon detector 245 and time interval analyzer 255 are used with the generated time bins. Further detail regarding the specific exemplary experiment is provided below in the Methods section of this disclosure.

The transformation matrix performed by the X gate 205 when probed by single time bins yields a computational basis fidelity $\mathscr{F}_C$ of 0.996±0.001, shown in FIG. 4b. As such computational-basis-only measurements do not reflect the phase coherence of the operation, the experimental set up uses the state measurement unit 240 to prepare superposition states as input and interfere the transformed time bins after the X gate 205. To this end, the state measurement unit comprises a cascade of 1-bin and 2-bin delay unbalanced interferometers 260, 265, respectively, operably coupled to the output of the X gate 205. In order to combat environmentally induced phase fluctuations in the interferometers 260, 265 and the X gate 205, a CW laser is sent in the backwards direction using a feedback phase control loop with PZTs 235, 260a, and 265a. This is discussed further below in the Methods section.

A phase of 0, φ and 2φ to the time-bins $|0\rangle_t$, and $|1\rangle_t$ and $|2\rangle_t$ is applied, respectively, with the phase modulator 225 in the state preparation stage and φ is swept from 0 to 2π, obtaining the interference pattern shown in FIG. 4c. After subtraction of the background, a visibility of 0.94±0.01 from the maximum and minimum points was calculated, showing strong phase coherence (the ability to preserve and utilize coherent superpositions) between the time bins after the gate. If assuming a channel model consisting of pure depolarizing (white) noise, this visibility can be used to estimate the process fidelity $\mathscr{F}_P$, finding $\mathscr{F}_P$=0.92±0.01 for the X gate. Given the ability to perform arbitrary one-qudit operations using combinations of X and Z gates, it follows that it is in principle possible to generate and measure photons in all mutually unbiased bases—an essential capability for high-dimensional quantum key distribution (QKD), which has been proven to offer greater robustness to noise compared to qubit-based QKD and can enable significantly higher secret key rates over metropolitan-scale distances.

This high-performance time-bin X gate 205 can thus be incorporated into a frequency network to realize deterministic two-qudit gates, where the frequency DoF acts as the control and the time DoF is the target qudit. FIG. 5a, for example shows an experimental set up 300 for two qudit gates for a single photon. For this demonstration, instead of a weak coherent state as with the X gate experimental set up of FIG. 4a, true single photons are used, heralded by detecting the partner photon of a frequency-bin entangled pair generated through spontaneous four-wave mixing in an on-chip silicon nitride microresonator 320.

In particular, first and second photons are provided by a photon source 305 that includes a continuous-wave laser source 310, an intensity modulator 315 and a silicon nitride microring resonator 320. The continuous-wave laser source 310 is the input to an intensity modulator 315 and cooperates with the intensity modulator 315 to generate time-bin qudits. The time bins, defined by intensity modulation of the pump via the intensity modulator 315, couple into the silicon nitride microring resonator 320 with a free spectral range (FSR) Δf=380 GHz and resonance linewidths of δf≈250 MHz, generating a biphoton frequency comb. The time-bin and frequency-bin entanglement of such photons have been proven, as discussed, for example, in Jaramillo-Villegas, J. A. et al. "Persistent energy-time entanglement covering multiple resonances of an onchip biphoton frequency comb." Optica 4, 655-658 (2016), Reimer, C. et al. "Generation of multi-photon entangled states with integrated optical frequency comb sources." Science (80-.). 351, 2-3 (2016), Kues, M. et al. "On-chip generation of high-dimensional entangled quantum states and their coherent control." Nature 546, 622-626 (2017), and Imany, P. et al. 50-GHz-spaced comb of high-dimensional frequency-bin entangled photons from an on-chip silicon nitride microresonator. Opt. Express 26, 1825-1840 (2018), all of which are incorporated herein by reference.

After the silicon nitride microring resonator 320, the experimental setup 300 further includes a pulse shaper 325, a heralding bypass 335, two single photon detectors 340a, 340b, and an event timer 345. The pulse shaper 325 is operably coupled to the output of the resonator 320. The bypass 335 is operably coupled between the pulse shaper 325 and the second photon detector 340b. The quantum logic gate 330 is operably coupled between the pulse shaper 325 and the first photon detector 340a, in parallel to the heralding bypass 335. The single photon detectors 340a, 340b are operably coupled to the event timer 345.

The quantum logic gate 330 is configured to perform a frequency dependent delay to generate non-separable states between the frequency bins and time bins in the photon. In this embodiment, the quantum logic gate 330 may suitably be a controlled increment ("CINC") gate 330a, or a SUM gate 330b. The quantum logic gate 330 in this embodiment is configured to operation on a photon with three frequency bins $|0\rangle_f$, $|1\rangle_f$, and $|2\rangle_f$.

The CINC gate 330a includes an optical switch 352, a first path 354a, and one or more other paths. In this example, the optical switch is a dense wavelength division multiplexer (DWDM) 352 configured to separate frequency bin $|2\rangle_f$ from $|0\rangle_f$ and $|1\rangle_f$. The first path 354a receives for frequency bin $|2\rangle_f$, and the one or more other paths 354b receive frequency bins $|0\rangle_f$ and $|1\rangle_f$. The first path 354a includes an X gate 355, configured to introduce a time-bin cyclic shift, and is coupled to an optical frequency combiner 360 (another DWDM). The X gate 355 may suitably have the same structure and operation as the X gate of FIG. 4a, namely, having a MZM 356, an interferometer 357, and a PZT 350. The bypass path(s) 354b is/are coupled directly to the optical combiner 360. The output of the combiner 360 is operably coupled to the single photon detector 340a via another DWDM 362.

As discussed above, the elements of the photon generate unit 305 cooperate to generate first and second photons, referred to herein as signal and idler photons, which are time-bin and frequency-bin entangled. As time- and frequency-bins exceed the Fourier limit (ΔfΔt=2280, δfΔt=1.5), the time-frequency entangled photons can be considered hyper-entangled—that is, entangled in two fully separable DoFs. The signal and idler photons from the first three comb line pairs are then selected and separated with a commercial pulse shaper 325, as shown in FIG. 5a. Now that the time bins and frequency bins are all generated in the state preparation stage, the idler photons are sent to the single photon detector 340b to be used as heralding photons, and the signal photons are what carry the two-qudits in the three time bins $\{|0\rangle_t, |1\rangle_t, |2\rangle_t\}$ and frequency bins $\{|0\rangle_f, |1\rangle_f, |2\rangle_f\}$. This procedure allows preparation of any time-bin/frequency-bin product state $|m\rangle_t|n\rangle_f$ (m, n=0,1,2) of the full computational basis set. In principle, arbitrary time-frequency superposition states can also be heralded in this setup, by first sending the idler photon through a combination of time- or frequency-bin interferometers prior to detection in the temporal and spectral eigenbases. This more general case would permit the preparation of any two qudit state.

In an exemplary operation using the CINC gate 330a, the X gate 355 is applied to the time-bin qudit only when the frequency qudit is in the state $|2\rangle_f$. This two-qudit gate, along with arbitrary single-qudit gates, which, as noted above, can be formed from single-qudit X and Z operations, complete a universal set for any quantum operation. To implement this gate, the frequency bin $|2\rangle_f$ is separated from the other two frequency bins, for example, using a dense wavelength-division multiplexing (DWDM) filter 352. The DWDM filter 352 routes the frequency bin $|2\rangle_f$ to the path 354a and thus to the time-bin X gate 355. The DWDM filter 352 routes the frequency bins $\{|0\rangle_f, |1\rangle_f\}$ to the other path 354b, where no operation happens on those other two frequency bins. The combiner DWDM 360 recombines the frequency bins with zero relative delay to complete the two-qudit gate operation.

To measure the transformation matrix of this gate in the computational basis, the first intensity modulator 315 and the pulse shaper 325, respectively, were used to prepare the input state in each of the 9 combinations of single time bins and frequency bins. The signal counts were then recorded in all possible output time-bin/frequency-bin pairs, conditioned on detection of a particular idler time frequency mode, by inserting three different DWDMs in the path of the signal photons to pick different frequency bins (the DWDM right before the single photon detector 340a).

The measured transformation matrix is shown in FIG. 5b, with accidental-subtracted fidelity $\mathcal{F}_C$, =0.90±0.01. The accidentals were subtracted in the transformation matrices, and the coincidence to accidentals ratio was ~3.7 in the CINC. As shown in FIG. 5b, the time/frequency pairs with the frequency bin $|2\rangle_f$ have been changed within the gate 330a.

In the experimental setup as shown in FIG. 5a, the same techniques used for the CINC gate 330a were also used to measure the transfer matrix shown of a SUM gate 330b, with the results shown in FIG. 5c, with $\mathcal{F}_C$=0.92±0.01. In this embodiment, the logic gate 330 is the SUM gate 330b, which may suitably comprise a chirped fiber Bragg grating (CFBG) 372 and a time-bin X gate 374. Similar to the X gate of FIG. 4a, the X gate 374 includes a Mach-Zehnder modulator MZM 374a, an interferometric structure 374b and PZT 374c. The SUM gate 330b, which can be thought of as a generalized controlled-NOT gate, adds the value of the control qudit to the value of the target qudit, modulo 3. Thus, in the SUM gate 330b, the time bins associated with $|0\rangle_f$ are not delayed, the time bins associated with $|1\rangle_f$ experience a cyclic shift by 1 slot, and the time bins corresponding to $|2\rangle_f$ go through a cyclic shift of 2 slots. To delay the time bins dependent of their frequencies, the CFBG 372 induces a dispersion of -2 ns/nm on the photons, imparting 6-ns (1-bin) and 12-ns (2-bin) delays for the temporal modes associated with $|1\rangle_f$ and $|2\rangle_f$, respectively, as required for the SUM operation. However, this delay is linear—not cyclic—so that some of the time bins are pushed outside of the computational space, to modes $|3\rangle_t$ and $|4\rangle_t$. The MZM 374a separates the time bins that fall outside of the computational space ($|3\rangle_t$ and $|4\rangle_t$) from the computational space time bins ($|0\rangle_t, |1\rangle_t$ and $|2\rangle_t$). Returning these bins to overlap with the necessary $|0\rangle_t$ and $|1\rangle_t$ slots can be achieved using principles identical to the time-bin X gate 205 with a relative delay of three bins, hence the inclusion of the X gate 374.

The fact that this SUM gate 330b is implemented with qudits in a single step potentially reduces the complexity and depth of quantum circuits in all the algorithms that require an addition operation. We note that to enhance computational capabilities, it would be valuable to also develop two qudit operations where instead time bins are the control qudit and frequency bins the target qudit which would then require active frequency shifting conditioned on time bins.

To show the ability of the techniques disclosed herein to operate on extremely large Hilbert spaces, the dimensions of the qudits are extended by encoding two 16-dimensional quantum states in the time and frequency DoFs of a single photon. For this demonstration, because more time bins and smaller frequency spacing between modes are desired, a broadband source of time-frequency entangled photons is used instead of the microring 320 with fixed frequency spacings. A 773 nm CW laser is shined on a periodically poled lithium niobate (PPLN) crystal, generating entangled photons with a bandwidth of ~5 THz. as discussed in Imany, P., Odele, O. D., Jaramillo-Villegas, J. A., Leaird, D. E. & Weiner, A. M. "Characterization of coherent quantum frequency combs using electro-optic phase modulation." *Phys. Rev. A* 97, (2018). 16 time bins are then carved with a full width at half maximum of ~200 ps and 1.2 ns spacing between them, to generate the time-bin qudits. Then, a pulse shaper is used to carve out the frequency of these entangled photons to generate sixteen 22 GHz wide frequency bins on both the signal and idler side of the spectrum, each 75 GHz spaced from each other. Now that there are 16-dimensional qudits in both time and frequency, the signal photon (heralded by the idler photon) into the same SUM-gate structure 330b. After the CFBG 372, the time bins will spread to ~300 ps due to their large bandwidth. This spreading can be reduced by using a smaller linewidth for our frequency modes, for example with a Fabry-Perot etalon. To verify the operation, different input two-qudit states were sent, chosen from one of 256 basis states, and the output was measured after the gate 330b.

Figure 6A:
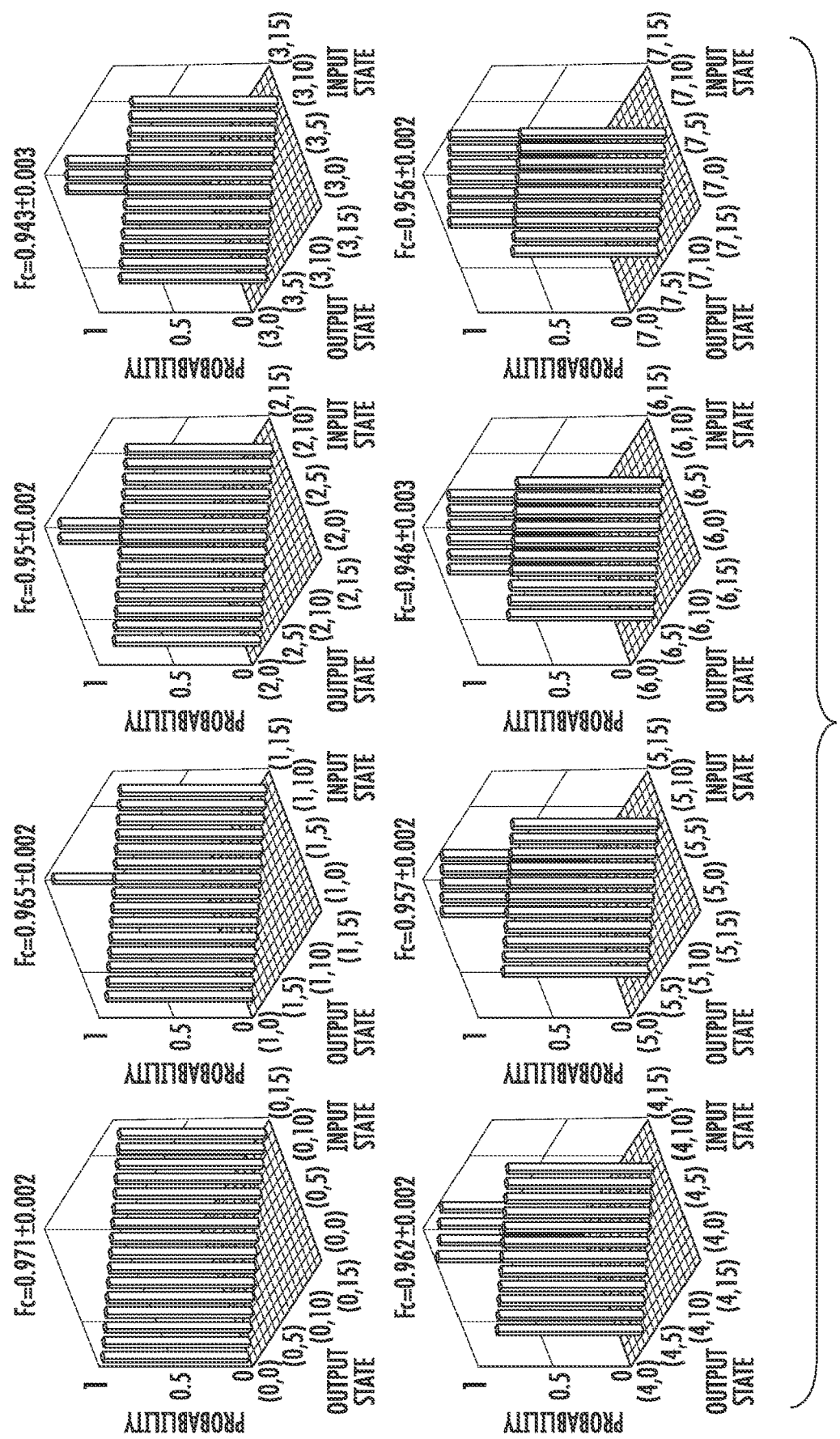
FIG. 6a shows a set of the transfer matrices of the SUM gate operation for two 16-dimensional quantum states in the time and frequency DoFs of a single photon.
Figure 6B:
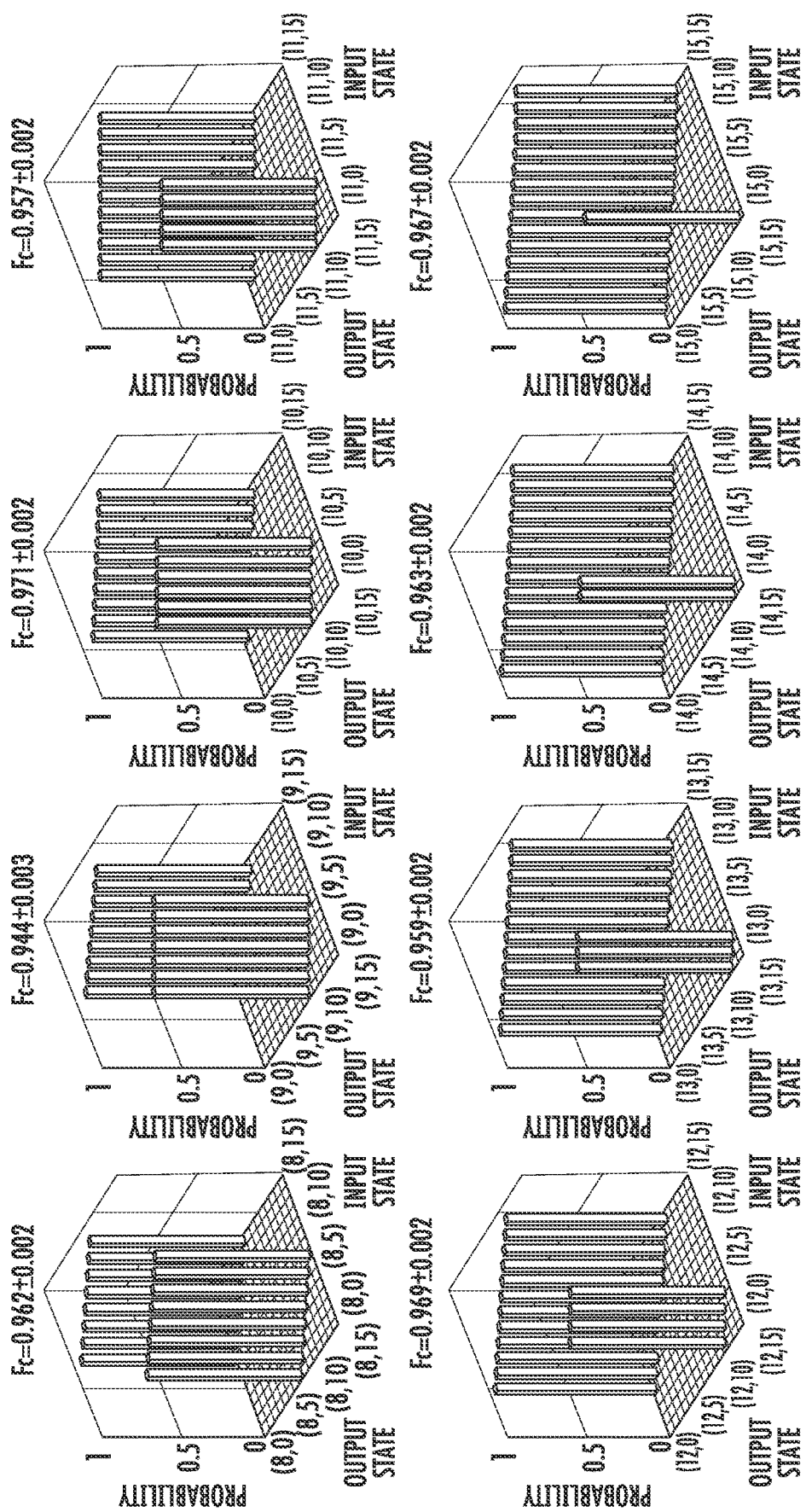
FIG. 6b shows another set of the transfer matrices of the SUM gate operation for two 16-dimensional quantum states in the time and frequency DoFs of a single photon.

While this yields a total of 256×256 ($2^{16}$) computational input/output combinations to test, there were no active frequency shifting elements in the setup, so it is reasonable to assume that the frequency qudit remains unchanged through the operation. This is also enforced by the high extinction ratio of the pulse shaper (~40 dB), which blocks unwanted frequency bins. This allows one to focus on results in the sixteen 16×16 transfer matrices measured in FIGS. 6A and 6B (a subset with a total of $2^{12}$ input/output combinations). In each matrix, 16 different inputs with the same frequency and different time bins are sent into the SUM gate 330b and the output time bins are measured.

For this experiment, superconducting nanowire single photon detectors (SNSPDs) as the detectors 340a, 340b were used, which allow the report of data without accidental subtraction. The average computational space fidelity for the whole process, with the assumption that frequencies do not leak into each other, can be calculated as $\bar{\mathcal{F}}_C$=0.9589±0.0005, which shows the high performance of our operation. This high fidelity is the result of the high extinction ratio of the intensity modulator used to carve the time bins (~25 dB). To show the coherence of the SUM gate 330b, the same setup performed a SUM operation on a three-dimensional input state, $$|\psi\rangle_{in} = \frac{1}{\sqrt{3}}(|0\rangle_f + |1\rangle_f + |2\rangle_f)|0\rangle_t$$

which results in a state maximally entangled between time and frequency DoFs:

$$|\psi\rangle_{out} = \frac{1}{\sqrt{3}}(|00\rangle_{ft} + |11\rangle_{ft} + |22\rangle_{ft}).$$

To quantify the dimensionality of this entangled state, an entanglement certification measure called entanglement of formation ($E_{of}$) was used, as discussed in Martin, A. et al. "Quantifying Photonic High-Dimensional Entanglement." *Phys. Rev. Lett.* 118, (2017), and Tiranov, A. et al. "Quantification of multidimensional entanglement stored in a crystal." *Phys. Rev. A* 96, (2017).

$E_{of} \geq 1.19 \pm 0.12$ ebits were experimentally obtained, where 1 ebit corresponds to a maximally entangled pair of qubits, while 1.585 ebits represents the maximum for two three-dimensional parties (see Methods); in exceeding the qubit limit, our state thus possesses true high-dimensional entanglement.

One of the most crucial challenges towards optical quantum operations is the lack of on-demand photon sources. Therefore, it is interesting to consider the techniques described herein for application to quantum communication and networking, for which operations with just a few qudits have potential impact. A gate similar to the SUM gate 330b is the XOR gate, which subtracts the control qudit from the target and is a requirement for qudit teleportation protocols, as discussed in Roa, L., Delgado, A. & Fuentes-Guridi, I. "Optimal conclusive teleportation of quantum states." *Phys. Rev. A At. Mol. Opt. Phys.* 68, 6 (2003). Since teleportation of quantum states is possible using different degrees of freedom of an entangled photon pair, a single photon two-qudit gate such as those of FIGS. 4a and 5a could be applied directly for teleporting high-dimensional states. Specifically, the XOR gate can be demonstrated by using positive dispersion and reconfiguring the switching in the SUM gate, or in the three-dimensional case, by simply relabeling the frequency bins $|0\rangle_f \rightarrow |2\rangle_f$ and $|2\rangle_f \rightarrow |0\rangle_f$ and performing the same process as the SUM operation.

Additionally, these two-qudit gates can be used for the purpose of beating the channel capacity limit for standard superdense coding for high-dimensional entangled states. The general concept of beating the channel capacity limit is discussed in Barreiro, J. T., Wei, T. C. & Kwiat, P. G. "Beating the channel capacity limit for linear photonic superdense coding." *Nat. Phys.* 4, 282-286 (2008). In such quantum communications applications for the two-qudit gates, a modest number of state manipulations brings potential impact.

Variants of the demonstrated SUM gate 330b can also be used to produce high-dimensional Greenberger-Horne-Zeilinger (GHZ) states. GHZ states consist of more than two parties, entangled with each other in a way that measurement of one party in the computational basis determines the state of all the other parties. Such properties of GHZ states are discussed, for example, in Pan, J. W., Bouwmeester, D., Daniell, M., Weinfurter, H. & Zellinger, A. "Experimental test of quantum nonlocality in three-photon Greenberger-Horne-Zeilinger entanglement." *Nature* 403, 515-519 (2000), which is incorporated herein by reference.

Such states have many interesting applications such as confirmation of Bell's theorem without inequalities, quantum secret sharing, as discussed in Hillery, M., Bužek, V. & Berthiaume, A. "Quantum secret sharing." *Phys. Rev. A* 59, 1829 (1999), and open destination quantum teleportation, as discussed in Zhao, Z. et al. "Experimental demonstration of five-photon entanglement and open-destination teleportation." *Nature* 430, 54-58 (2004). It has been only recently that these states were demonstrated in more than two dimensions, where a three-dimensional three-party GHZ state was realized using the orbital angular momentum of optical states.

In the embodiment described herein, the photons are encoded in multiple time bins and frequency bins. To this end, the frequency spacing between different modes ($\Delta f$) and the time-bin spacing ($\Delta t$) are chosen such that they far exceed the Fourier transform limit (i.e., $\Delta f \Delta t \gg 1$). As such, it is possible to manipulate the time and frequency DoFs independently in a hyper-encoding fashion, using concepts developed in time-division and wavelength-division multiplexing, respectively. Such techniques are discussed in Fang, W.-T. et al. "Towards high-capacity quantum communications by combining wavelength-and timedivision multiplexing technologies." *arXiv Prepr.* arXiv1803.02003 (2018), and Humphreys, P. C. et al. "Continuous-variable quantum computing in optical time-frequency modes using quantum memories." *Phys. Rev. Lett.* 113, (2014), both of which are incorporated herein by reference. As a result, each time-frequency mode pair constitutes a well-defined entity, or plaquette, which is sufficiently separated from its neighbors to provide stable encoding.

FIG. 7a shows a flow diagram of another method that generates multiparty states in the frequency and time degrees of freedom. In step 402, first photon and second photon are generated, each having at least two frequency bins, (preferably three or more) and at least one time bin. The first and second photons are entangled with each other. In this embodiment, the first and second photon only have a single time bin in step 402.

Thereafter, in step 404, a frequency dependent time shift, for example, a time delay, is performed on each of the first and second photons to form at least a second time bin, and entangle (i.e. make nonseparable) the time and frequency bins within each photon to create four-party Greenberger-Horne-Zeilinger (GHZ) states. If the initial photons are entangled in more than two frequency bins, the final state will be a four-party multidimensional GHZ state. Step 404 may be carried out by the novel quantum gate discussed herebelow. The resultant GHZ states consist of more than two parties, entangled with each other in a way that measurement of one party in the computational basis determines the state of all the other parties. Such properties of GHZ states are discussed, for example, in Pan, J. W., Bouwmeester, D., Daniell, M., Weinfurter, H. & Zellinger, A. "Experimental test of quantum nonlocality in three-photon Greenberger-Horne-Zeilinger entanglement." *Nature* 403, 515-519 (2000), which is incorporated herein by reference.

In the present disclosure the SUM gate and the large dimensionality of time-frequency states facilitate the generation of a four-party GHZ state with 32 dimensions in each DoF. The starting state is expressed as the state, $$|\psi\rangle_{in} = \frac{1}{\sqrt{32}}|0, 0\rangle_{t_s t_i} \sum_{m=0}^{31}|m, m\rangle_{f_s f_i}$$

which means both the first photon and the second photon are initialized (step 405) in the first time-bin state and are maximally entangled in the frequency domain. Then, deterministic SUM gates operate (step 407) separately on both the first and second photons, resulting in a four-party GHZ state of the form $$|\psi\rangle_{out} = \frac{1}{\sqrt{32}} \Sigma_{m=0}^{31} |m, m, m, m\rangle_{f_s t_s f_i t_i}.$$

Such four-party GHZ states are useful, for example, in quantum key distribution and other quantum communication protocols, as there are two highly entangled photons. Accordingly, in step 406, the first photon is transmitted to a location that is different from the location of the second photon. Thereafter, in step 408, a deterministic quantum operation is performed at least on the first photon, for example, consistent with quantum key distribution. As noted in FIG. 3, the first photon, having multiple frequency and time bins that are inseparable or entangled with each other, is suited for deterministic operations.

FIG. 7b shows a schematic block diagram of an apparatus for generating large-scale optical entangled states using high-dimensional quantum logic, and which may carry out at least steps 402 and 404 of FIG. 7a. In general, the apparatus 410 includes a generator 412 and a SUM gate 424. The generator 412, combined with the pulse shaper 420 is configured to generate a signal (first) photon and an idler (second) photon such that the signal photon and idler photon are entangled in the frequency domain in two or more different frequency bins, and preferably more than three different frequency bins, and such that the signal photon and idler photon have the same time value. As will be discussed further below, the pulse shaper 420 can also separate the single and idler photons into different routes. As discussed above, methods of (and accompanying component elements for) generating signal and idler photons with entangled frequency states and one or more entangled time states are known. In one embodiment, the generator 412 includes a coherent light source such as a pump laser 416, operably coupled to a lithium niobate crystal 417, which is further coupled to an intensity modulator 418. However, other suitable arrangements may be used. In one example, the order of the lithium niobate crystal 417 and intensity modulator 418 is reversed.

The SUM gate 424 in this configuration is a dispersion module 424, for example, a chirped fiber Bragg grating (CFBG). As discussed above, the SUM gate 424 is an optical gate configured to perform a deterministic action on a respective one of the signal and idler photons to entangle (i.e., make inseparable) the time and frequency degrees of freedom in each photon. Before separating the photons with a pulse shaper 420, a single CFBG can operate the SUM gate 424 on both signal and idler photons even before generating the frequency bins with the pulse shaper 420.

In operation, the generator 412, combined with the pulse shaper 420, operates to generate signal and idler photons that are highly entangled with each other in a plurality of frequency bins, and in a single time bin. The SUM gate 424 performs a deterministic action on each of the signal and idler photons to entangle (make inseparable) the time and frequency degrees of freedom in each photon, thereby creating four-party Greenberger-Horne-Zeilinger states which can be multidimensional, having wave functions characterized by $$|\psi\rangle_{out} = \frac{1}{\sqrt{d}} \Sigma_{m=0}^{d-1} |m, m, m, m\rangle_{f_s t_s f_i t_i}$$

wherein $f_s$ is the signal frequency party, $f_i$ is the idler frequency party, $t_s$ is the signal time party, and $t_i$ is the idler time party.

Since the initial state only consists of the first time bins, the dispersion module 424 does not shift any of the bins outside of the computational space; hence the interferometric structure used in the full SUM gate 330b is not required when operating within this subspace. The GHZ state is measured in the computational basis. The pulse shaper 420 may then be used to separate the signal and idler photons, allowing for their different subsequent uses. Such subsequent uses may include transmitting the signal and idler photons to different locations and performing deterministic operations on either or both, as discussed above in connection with FIG. 7a.

Figure 8B:
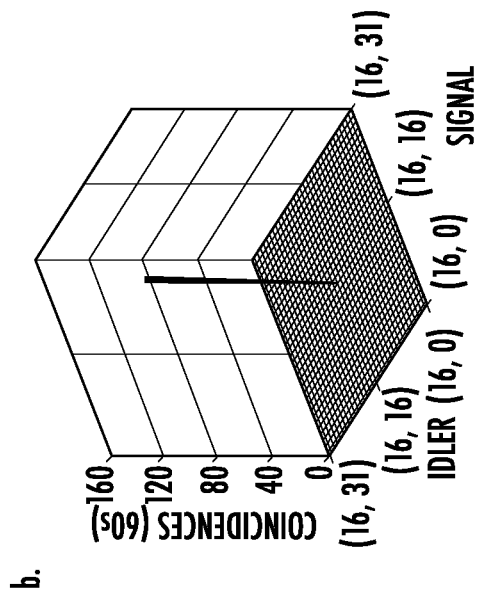
Figure 8C:
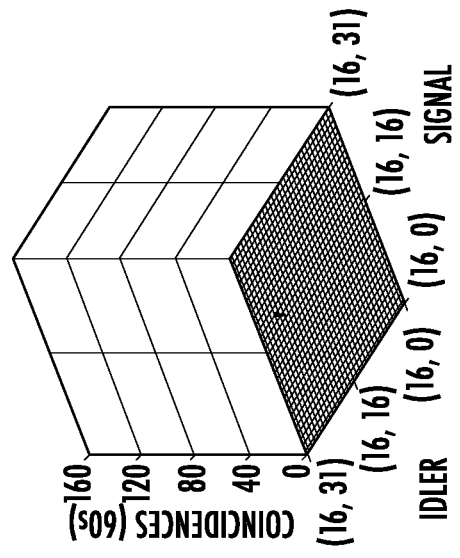
Figure 8A:
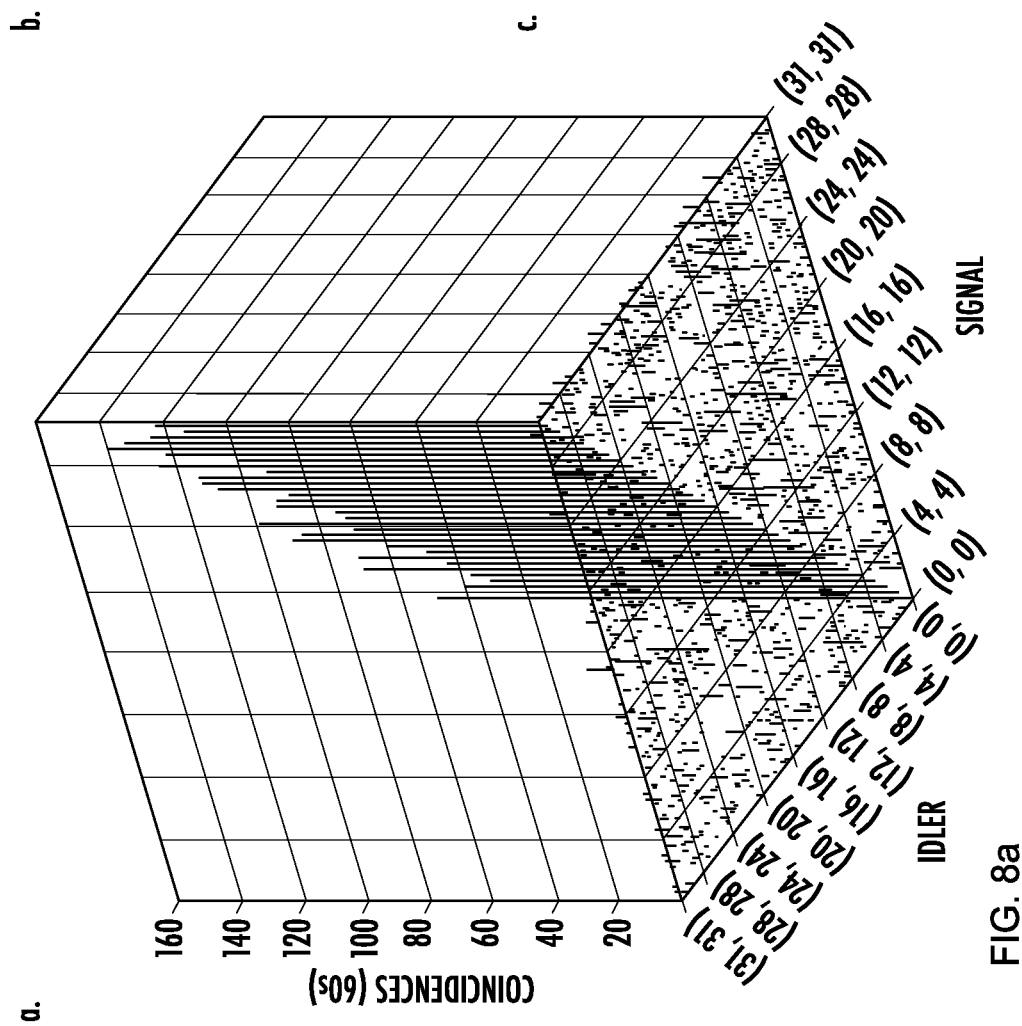
FIG. 8a shows the measurement of the four-party 32-dimensional GHZ state in the computational basis, generated in accordance with the method of FIG. 2 and in the system of FIG. 7.

FIG. 8a shows a plot of coincidences for all basis states in the set $\{|m, n, k, l\rangle_{f_s t_s f_i t_i}; 0 \leq m, n, k, l \leq 31\}$. Only states whose four qudits match (i.e. $|m, m, m, m\rangle_{f_s t_s f_i t_i}$) have high counts, as expected for a GHZ state.

In particular, FIG. 8a shows the measurement of the four-party 32-dimensional GHZ state in the computational basis, generated in accordance with the method of FIG. 2 and in the system of FIG. 7b. The states $|m, n\rangle$ shown on the signal and idler axes correspond to frequency-bin m and time bin n. The large coincidence peaks exist only for states with the same time-bin and frequency-bin indices for both signal and idler (32 peaks). FIGS. 8b and 8c show zoomed in 32×32 submatrices of the matrix shown in FIG. 8a. Each submatrix shows coincidences for different signal and idler time bin indices for fixed signal and idler frequency bin indices. FIG. 8b shows matched signal and idler frequency bins, where a large peak is observed for $|16, 16, 16, 16\rangle_{f_s t_s f_i t_i}$. FIG. 8c shows unmatched signal and idler frequency bins. The small peak evident at $|16, 16, 23, 23\rangle_{f_s t_s f_i t_i}$ reflects additional accidentals (multiphoton pair events) at the time bins to which frequency bins $|16\rangle_{f_s}$ and $|23\rangle f_i$ are shifted. The data are shown with accidentals subtracted (coincidence to accidentals ratio of ~4).

It will be appreciated that full characterization of the state requires measurements in superposition bases as well, but due to the additional insertion loss associated with superposition measurements in time and frequency using interferometers and phase modulators, respectively, such projections were not measured in this experiment. It is anticipated that there would be dramatically lower insertion losses with on-chip components, which may make these measurements possible. Remarkably, the demonstrated GHZ state resides in a Hilbert space equivalent to that of 20 qubits, an impressive 1,048,576 ($32^4$) dimensions. The realization of such high-dimensional GHZ states indicates the potential of the time-frequency platform for near-term quantum technologies such as cluster-state quantum computation.

Hyper-entangled time-frequency entangled states, as opposed to other high-dimensional optical degrees of freedom like orbital angular momentum, can be generated in integrated on-chip sources, which have gained tremendous attention in recent years due to their low cost, room temperature operation, compatibility with CMOS foundries and the ability to be integrated with other optical components. Pulse shapers, phase modulators and MZMs can all be demonstrated on a chip, and a series of DWDMs and delay lines can be used to demonstrate an on-chip CFBG. In addition, demonstration of balanced and unbalanced interferometers on-chip reduces fast fluctuations, making stabilization easier, which is of considerable profit for the scalability of the scheme. These contributions can potentially lead to combining these sources with on-chip components designed for manipulation of these states, to create the whole process on an integrated circuit.

As discussed, above, high-dimensional optical states can open the door to deterministically carry out various quantum operations in relatively large Hilbert spaces, as well as having higher encoding efficiency in quantum communication protocols such as quantum key distribution and quantum teleportation. Experiments disclosed herein have demonstrated deterministic single- and two-qudit gates using the time and frequency degrees of freedom of a single photon for encoding—operating on up to 256 ($2^8$)-dimensional Hilbert spaces—and carried out these gates with a high computational space fidelity. The application of such two-qudit gates in near-term quantum computation is possible by using them to realize a GHZ state of four parties with 32 dimensions each, corresponding to a Hilbert space of more than one million modes. Such deterministic quantum gates add significant value to the photonic platform for quantum information processing and have direct application in, e.g., simulation of quantum many-body physics.

Methods

For the time-bin single qudit X gate 205 shown in FIG. 4a, we split the experimental setup 200 in three stages: state preparation 215, X gate 205 operation and state measurement 240. For the state preparation 215, we use an Agilent 81645A CW laser 210 tuned to 1553.9 nm and send it into an intensity modulator 220 (~4 dB insertion loss) and phase modulator 225 (~3 dB insertion loss), both manufactured by EOSpace, which are used to create the time bins and control their relative phases, respectively. To implement the X gate 205, we used an MZM 230 with two complementary outputs (~4 dB insertion loss), also manufactured by EOSpace. We also use a piezo-based fiber phase shifter 235 (General Photonics FPS-001) to control the phase difference between the two paths following the MZM 230. Then a 2×2 fiber coupler 250 is used to merge the branches. For the state measurement 240, we used 1-bin and 2-bin delay interferometers 260, 265 implemented with 2×2 3 dB fiber couplers and additional piezo-based fiber phase shifters 260a, 260b.

For the time-bin X gate and computational-basis measurements of three-dimensional two-qudit gates, gated InGaAs single photon detectors (Aurea Technologies SPD_AT_M2) 245 were used. For the rest of the measurements, we used superconducting nanowire single photon detectors (Quantum Opus). To measure the arrival times of the photons on the single photon detectors, a time interval analyzer (PicoQuant HydraHarp 400) is used. The stabilization of the interferometers is done by sending a CW laser at 1550.9 nm in the backwards direction and feeding the output power into a computer based feedback loop to maintain the phase. To stabilize the X gate 205, we use a similar scheme with an additional circulator at the input of the gate (not shown in the figures) to retrieve the optical power in the backwards direction. The signal applied to the intensity modulators and phase modulator, as well as the trigger and synchronization signal of the single photon detector and time interval analyzer, are generated by an electronic arbitrary waveform generator Tektronix AWG7122B and adjusted to the proper level by linear amplifiers.

To assess the performance of our one-and two-qudit quantum gates, we first focus on the computational-basis fidelity $\mathcal{F}_C$—one example of a so-called "classical" fidelity in the literature, such as in De Greve, K. et al. "Complete tomography of a high-fidelity solid-state entangled spin-photon qubit pair." Nat. Commun. 4, 2228 (2013) 49. Defining $|n\rangle$ (n=0, 1, . . . , N−1) as the set of all computational basis states and $|uV\rangle$ as the corresponding output states for a perfect operation, we have the fidelity $$\mathcal{F}_c = \frac{1}{N} \sum_{n=0}^{N-1} p(u_n \mid n) \quad (1)$$

where $p(u_N|n)$ is the probability of measuring the output state $|u_n\rangle$ given an input of $|n\rangle$. In the operations considered here, the ideal output states $|u_n\rangle$ are members of the computational basis as well, so there is no need to measure temporal or spectral superpositions in determination of $\mathcal{F}_c$. Given the measured counts, we retrieve the N conditional probability distributions via Bayesian mean estimation (BME) where our model assumes that each set of count outcomes (after accidentals subtraction) follows a multinomial distribution with to-be-determined probabilities; for simplicity, we take the prior distributions as uniform (equal weights for all outcomes). We then compute the mean and standard deviation of each value $p(u_n|n)$ and sum them to arrive at $\mathcal{F}_c$. Specifically, if $C_{u_n|n}$ signifies the counts measured for outcome $u_n$, and $C_{tot|n}$ the total counts over all outcomes (both for a given input state $|n\rangle$), BME predicts:

$$p(u_n \mid n) = \frac{1 + C_{u_n|n}}{N + C_{tot|n}} \pm \sqrt{\frac{1 + C_{u_n|n}}{(N + C_{tot|n})^2} \frac{N + C_{tot|n} - C_{u_n|n} - 1}{N + C_{tot|n} + 1}} \quad (2)$$

where the standard deviation in the estimate is used for the error. Since the probabilities here each actually come from N different distributions, we estimate the total error in $\mathcal{F}_C$ by adding these constituent errors in quadrature. Explicitly, we find $\mathcal{F}_C$=0.996±0.001 for the X gate, 0.90±0.01 for the CINC operation, 0.92±0.01 for the 3×3 SUM gate, and $\mathcal{F}_C$=0.9589±0.0005 for the 16×16 SUM gate. The reduction in $\mathcal{F}_C$ for the two-qudit gates is due in large part to the fewer total counts in these cases, from our use of heralded single photons rather than a weak coherent state. As seen by the presence of N in the denominator of Eq. (2), even when $Cu_n|n=C_{tot|n}$, the estimate $(u_n|n)$ is not unity unless $C_{tot|n} \gg N$. In our experiments, the two-qudit tests have only ~100-300 total counts per input computational basis state for the 9×9 matrices (with N=9) and ~500-800 counts per input state for the 16×16 matrices (with N=16), thereby effectively bounding the maximum $p(u_n|n)$ and, by extension, fidelity $\mathcal{F}_C$. This behavior is actually a strength of BME, though, as it ensures that we have a conservative estimate of the fidelity that is justified by the total amount of data acquired. as discussed in Blume-Kohout, R. "Optimal, reliable estimation of quantum states." New J. Phys. 12, 043034 (2010).

While extremely useful for initial characterization, however, the computational-basis fidelity above provides no information on phase coherence. On the other hand, process tomography would offer a complete quantification of the quantum gate. Yet due to the challenging experimental complexity involved in quantum process tomography, here we choose a much simpler test which—while limited—nonetheless offers strong evidence for the coherence of our time-bin X gate. To begin with, note that all three-dimensional quantum processes can be expressed in terms of the nine Weyl operations, as discussed in Bertlmann, R. A. & Krammer, P. "Bloch vectors for qudits." *J. Phys. A Math. Theor.* 41, 235303 (2008):

$$U_0 = I = \begin{pmatrix} 1 & 0 & 0 \\ 0 & 1 & 0 \\ 0 & 0 & 1 \end{pmatrix}, \quad (3)$$

$$U_1 = X = \begin{pmatrix} 0 & 0 & 1 \\ 1 & 0 & 0 \\ 0 & 1 & 0 \end{pmatrix},$$

$$U_2 = X^2 = \begin{pmatrix} 0 & 1 & 0 \\ 0 & 0 & 1 \\ 1 & 0 & 0 \end{pmatrix}$$

$$U_3 = Z = \begin{pmatrix} 1 & 0 & 0 \\ 0 & e^{i\frac{2\pi}{3}} & 0 \\ 0 & 0 & e^{-i\frac{2\pi}{3}} \end{pmatrix},$$

$$U_4 = ZX = \begin{pmatrix} 0 & 0 & 1 \\ e^{i\frac{2\pi}{3}} & 0 & 0 \\ 0 & e^{-i\frac{2\pi}{3}} & 0 \end{pmatrix},$$

$$U_5 = ZX^2 = \begin{pmatrix} 0 & 1 & 0 \\ 0 & 0 & e^{i\frac{2\pi}{3}} \\ e^{-i\frac{2\pi}{3}} & 0 & 0 \end{pmatrix},$$

$$U_6 = Z^2 = \begin{pmatrix} 1 & 0 & 0 \\ 0 & e^{-i\frac{2\pi}{3}} & 0 \\ 0 & 0 & e^{i\frac{2\pi}{3}} \end{pmatrix},$$

$$U_7 = Z^2 X = \begin{pmatrix} 0 & 0 & 1 \\ e^{-i\frac{2\pi}{3}} & 0 & 0 \\ 0 & e^{i\frac{2\pi}{3}} & 0 \end{pmatrix},$$

$$U_8 = Z^2 X^2 = \begin{pmatrix} 0 & 1 & 0 \\ 0 & 0 & e^{-i\frac{2\pi}{3}} \\ e^{i\frac{2\pi}{3}} & 0 & 0 \end{pmatrix},$$

The quantum process itself is a completely positive map $\varepsilon$ (see O'Brien, J. L. et al. Quantum Process Tomography of a Controlled-NOT Gate. *Phys. Rev. Lett.* 93, 80502 (2004), which for a given input density matrix $\rho_{in}$ outputs the state $$\rho_{out} = \varepsilon(\rho_{in}) = \sum_{m,n=0}^{8} \chi_{mn} U_m \rho_{in} U_n^\dagger \quad (4)$$

The process matrix with elements $\chi_{mn}$ uniquely describes the operation. The ideal three-bin X gate with process matrix $\chi_X$ has only one nonzero value, $[\chi_X]_{11}=1$. To compare to this ideal, we assume the actual operation consists of a perfect X gate plus depolarizing (white) noise. In this case we have a total operation modeled as $$\rho_{out} = \lambda U_1 \rho_{in} U_1^\dagger + \frac{(1-\lambda)}{3} \mathbb{I}_3 \quad (5)$$

whose process matrix we take to be $$\chi_N = \lambda \chi_X + \frac{1-\lambda}{9}\mathbb{I}9,$$

which can be calculated by using $$\mathbb{I}_3 = \frac{1}{3}\Sigma_{n=0}^{8} U_n \rho_{in} U_n^{\dagger 19}.$$

if we then assume a pure input superposition state $\rho_{in}=|\psi_{in}\rangle\langle\psi_{in}|$, where $|\psi_{in}\rangle \propto |0\rangle_t + e^{i\varnothing}|1\rangle_t + e^{2i\varnothing}|2\rangle_t$, and measure the projection onto the output $|\psi_{out}\rangle \propto |0\rangle_t + |1\rangle_t + |2\rangle_t$ (as in FIG. 2c), $\lambda$ can be estimated from the interference visibility V as:

$$\lambda \simeq \frac{2V}{3-V} \quad (6)$$

and the process fidelity is then given by:

$$\mathcal{F}_P = Tr(X_X X_N) = [X_N]_{11} = \frac{1+8\lambda}{9} = \frac{1+5V}{9-3V} = 0.92 \pm 0.01 \quad (7)$$

as discussed in the main text.

To show the coherence of our SUM gate 330b of FIG. 5a, we generate an input state in the signal photon which is in time-bin $|0\rangle_t$ and an equi-amplitude superposition in frequency $$|\psi\rangle_{in} = \frac{1}{\sqrt{3}}(|0\rangle_f + |1\rangle_f + |2\rangle_f)|0\rangle_t.$$

After passing this state through the SUM gate 330b, the time-bin state of the photon is shifted based on the frequency, leaving us with a maximally entangled state $$|\psi\rangle_{out} = \frac{1}{\sqrt{3}}(|00\rangle_{ft} + |11\rangle_{ft} + |22\rangle_{ft}).$$

We note that since we are starting with time-bin zero, the time bins will not fall out of the computational space; therefore, the interferometric structure (e.g. elements 260, 265 of FIG. 4a) is not needed for the SUM gate 330b and the dispersion module alone can do the operation. This saves us the extra insertion loss of the interferometers, which is an important parameter due to the low photon pair rate on the detectors in this particular experiment. To measure the 3-dimensional entanglement in $|\psi\rangle_{out}$, we must vary the phases of different signal frequency bins and time bins with a pulse shaper and phase modulator, respectively. To observe the effect of this phase sweep with our relatively slow single-photon detectors (with ~100 ps jitter), an indistinguishable projection of all three time bins and frequency bins should be created.

FIG. 9a shows schematic block diagram of an experimental set-up of a SUM gate 520 that does not include an interferometer. Specifically, FIG. 9a shows a set up 500, having spontaneous parametric down conversion source 505, a pulse shaper 510, an intensity modulator 525, a dispersion module 520, a phase modulator 515, and a state projection stage 530. The state projection stage 530 includes another dispersion module 535, two additional phase modulators 540, 545, and two further pulse shapers 550, 555. The pulse shaper 510 diverts the signal photon and idler photon to paths 510a, 510b respectively. The path 510a includes the intensity modulator 515, the dispersion module 520 (the sum gate), and phase modulator 525, and the dispersion module 535, the phase modulator 540 and pulse shaper 550. The dispersion module 520 is a −2 ns/nm dispersion module, and the dispersion module 535 is a +2 ns/nm dispersion module. The heralding path 510b includes the phase modulator 545 and the pulse shaper 555.

In general, the time bins can be projected on an indistinguishable state by using a cascade of interferometers, such as the interferometers 240 of FIG. 4a. However, in the experimental set-up 500, it is simpler to use a dispersion module 535 with opposite dispersion to that of the module 520 used in the SUM gate to perform the same projection. After the dispersion module 535, the frequency bins are then projected on an indistinguishable state using the phase modulator 540 and pulse shaper 550 to mix the frequencies—a technique used previously in Imany, P. et al. 50-GHz-spaced comb of high-dimensional frequency-bin entangled photons from an on-chip silicon nitride microresonator. *Opt. Express* 26, 1825-1840 (2018), which is incorporated herein by reference.

We note that our measurements on the signal photons are conditioned on heralding by idler frequency superposition states. To measure the interference between different signal frequency bins, the idler photons too have to be projected on an indistinguishable frequency bin using the phase modulator 545 and pulse shaper 555. This projection guarantees that detection of an idler photon does not give us any information on the frequency of the signal photon. Unlike prior experiments, however, the phases of the idler frequency bins are held constant; only the phases of the signal frequency and time bins are varied. This is in contrast to experiments in Imany, P. et al. comb of high-dimensional frequency-bin entangled photons from an on-chip silicon nitride microresonator. *Opt. Express* 26, 1825-1840 (2018), where the phases of both signal and idler frequency bins were varied.

In the experiment, three-dimensional interference measurements were not possible since mixing all three frequencies together adds extra projection loss, which we cannot afford. Therefore, we vary the phases of different time bins and frequency bins to measure two-dimensional interference patterns between all three time bins and frequency bins (FIG. 9c). Using the visibilities of these interference patterns along with a joint spectral intensity (JSI) measurement (FIG. 9b) can give us a lower bound on the amount of entanglement present in our system by measuring entanglement of formation. (See Tiranov, A. et al. "Quantification of multidimensional entanglement stored in a crystal." *Phys. Rev. A* 96, (2017), and Barreiro, J. T., Wei, T. C. & Kwiat, P. G. "Beating the channel capacity limit for linear photonic superdense coding." *Nat. Phys.* 4, 282-286 (2008). The JSI denotes the correlations between the time bins and frequency bins of a signal photon heralded by an idler photon in its computational basis.

The same time-bin and frequency-bin spacings (1.2 ns, 75 GHz) as the 16-dimensional SUM gate experiment are used for these measurements. We note that in this experiment, the IM 515 was placed only on the signal photons' route to avoid its insertion loss on the idler photons. FIG. 9b shows a graph of the Joint spectral intensity of the three-dimensional entangled state. The accidentals were subtracted in this measurement, with a coincidence to accidentals ratio of about 30.

FIG. 9c shows graphs of two dimensional interference patterns showing the coherence between all three time-frequency modes of the entangled state. The frequency-bin and time-bin phases are varied using PS1 and PM1, respectively. Both phases are swept together from 0 to $\pi$, for a total phase sweep from 0 to $2\pi$. The data are shown with accidentals subtracted and coincidence to accidentals ratio of about 1. Since projection of frequency bins 0 and 2 on an indistinguishable frequency bin undergoes more projection loss, the coincidences between modes 0 and 2 were measured in 10 minutes.

The measurement was done using the same experimental setup used in FIG. 9a without the equipment used for sweeping the phase of different signal time bins and projection measurements. For this measurement, the idler photons were detected after PS1, and the signal photons were detected right after the SUM gate. Having the JSI measurement and the two-dimensional interference visibilities in hand, we have all the data needed to calculate the entanglement of formation in our system, which can be expressed as:
where $$E_{of} \geq -\log_2\left(1 - \frac{B^2}{2}\right) \qquad (8)$$

$$\text{where } B = \frac{2}{\sqrt{|C|}}\left(\sum_{\substack{(j,k)\in C \\ j<k}} |\langle j, j|\rho|k, k\rangle| - \sqrt{\langle j, k|\rho|j, k\rangle\langle k, j|\rho|k, j\rangle}\right) \qquad (9)$$

Here, C is the number of indices (j, k) used in the sum. This measurement is useful when we do not have access to all the elements of the density matrix. $\langle j, j|\rho|k, k (j\neq k)\rangle$ elements indicate the coherence between modes j and k, and can be lower-bounded using the two-dimensional visibilities. The terms $\langle j, k|\rho|j, k\rangle$ can be calculated using the elements of the JSI. Using these values, we measure $E_{of} \geq 1.19\pm0.12$ ebits, which indicates greater than two dimensional entanglement in our bipartite system, more than one standard deviation away from the threshold. To generate the 32-dimensional four-party GHZ state, the signal and idler go through the same dispersion module (−2 ns/nm). After dispersion, the signal frequency bins farther away from the center of the spectrum are delayed more, but the idler frequency bins are delayed less as we move farther away from the center. In order to write the GHZ state in the form $$|\psi\rangle_{out} = \frac{1}{\sqrt{32}}\Sigma_{m=0}^{31}|m, m, m, m\rangle_{f_s t_s f_i t_i},$$

we label the signal time bins after dispersion 0 to 31 starting from earlier time bins (time bin 0 the earliest, time bin 31 the latest), while on the idlers, we label the time bins such that the earliest time bin is 31 and the latest time bin is 0. Another choice would be to send signal and idler through separate modules with equal but opposite dispersion, in which case we would use identical time labeling. To measure the state illustrated in FIG. 5, we individually measured coincidences for the 32 different settings of both signal and idler frequency bins (32×32 measurements). For each of these measurements, we used our event timer to assign signal and idler time bins for each coincidence, which results in a 32×32 submatrix for each signal-idler frequency setting. Therefore, we have $32^4$ measurements in total. Two of the 32×32 time-bin submatrices are shown in FIG. 8b,c.

What is claimed is:

1. An optical quantum logic gate, comprising
an input configured to receive a first photon encoded with quantum information in two or more frequency bins and at least one time bin; and
an optical gate element configured to perform a frequency dependent time operation to generate non-separability between the frequency bins and at least two time bins in the first photon, and wherein a different number of time bins in the first photon can exist after the frequency dependent time operation.

2. The optical quantum logic gate of claim 1, wherein the optical gate element further comprises:
a frequency router configured to separate at least two of the frequency bins into at least first and second spatial paths;
a time-domain logic gate configured to perform a time operation in the second spatial path; and
a combiner operably coupled to recombine the frequency bins on the at least first and second spatial paths into an output spatial path.

3. The optical quantum logic gate of claim 2, wherein each of the frequency router and the combiner comprises a dense wavelength division multiplexer.

4. The optical quantum logic gate of claim 2, the time-domain logic gate comprises a cyclic shift X gate.

5. The optical quantum logic gate of claim 1, wherein the optical gate element includes a dispersion module configured to perform a group velocity dispersion to delay at least one of the frequency bins based on frequency.

6. The optical quantum logic gate of claim 5, wherein the dispersion module comprises a chirped fiber Bragg grating to perform the group velocity dispersion.

7. The optical quantum logic gate of claim 5, wherein the optical gate further comprises a time-domain logic gate operably coupled to the dispersion module.

8. The optical quantum logic gate of claim 1, wherein the frequency dependent time operation comprises a frequency dependent delay.

\* \* \* \* \*